United States Patent
Bogie et al.

(10) Patent No.: US 11,083,652 B2
(45) Date of Patent: Aug. 10, 2021

(54) SMART FOOT POSITION SENSOR FOR POWER WHEELCHAIR USERS, AND SYSTEMS AND METHODS OF USING SAME

(71) Applicants: The Government of the United States of America as represented by the Department of Veterans Affairs, Washington, DC (US); CASE WESTERN RESERVE UNIVERSITY, Cleveland, OH (US)

(72) Inventors: Katherine M. Bogie, Shaker Heights, OH (US); Mary Kristina Henzel, Cleveland, OH (US); Steven Majerus, Cleveland, OH (US); Steven J. Mitchell, Cleveland, OH (US)

(73) Assignees: United States Government as Represented by the Department of Veterans Affairs, Washington, DC (US); Case Western Reserve University, Cleveland, OH (US)

( * ) Notice: Subject to any disclaimer, the term of this patent is extended or adjusted under 35 U.S.C. 154(b) by 0 days.

(21) Appl. No.: 16/500,002

(22) PCT Filed: Apr. 3, 2018

(86) PCT No.: PCT/US2018/025872
§ 371 (c)(1),
(2) Date: Oct. 1, 2019

(87) PCT Pub. No.: WO2018/187320
PCT Pub. Date: Oct. 11, 2018

(65) Prior Publication Data
US 2020/0060905 A1   Feb. 27, 2020

Related U.S. Application Data

(60) Provisional application No. 62/485,666, filed on Apr. 14, 2017, provisional application No. 62/480,804, filed on Apr. 3, 2017.

(51) Int. Cl.
*A61G 5/12* (2006.01)
*G01C 3/08* (2006.01)
*G01L 1/20* (2006.01)

(52) U.S. Cl.
CPC ............... *A61G 5/128* (2016.11); *G01C 3/08* (2013.01); *G01L 1/205* (2013.01); *A61G 2203/32* (2013.01); *A61G 2203/40* (2013.01)

(58) Field of Classification Search
USPC .................................................... 340/686.6
See application file for complete search history.

(56) References Cited

U.S. PATENT DOCUMENTS 5,635,777 A * 6/1997 Telymonde ............... H01H 3/14
                                                          200/86.5
5,945,610 A * 8/1999 Galasso ............... A61B 5/1036
                                                          356/613
(Continued)

FOREIGN PATENT DOCUMENTS

| EP | 0970657 A1 | 1/2020 |
|---|---|---|
| WO | WO 2016/049583 A1 | 2/2010 |
| WO | WO-2016042407 A1 * | 3/2016 ............ A63F 13/428 |

OTHER PUBLICATIONS https://www.rehab.research.va.gov/jour/04/41/3b/simpson.html, Simpson et al. May 2004, vol. 4, pp. 429-442 (Year: 2004).*

(Continued)

*Primary Examiner* — Omar Casillashernandez
(74) *Attorney, Agent, or Firm* — Ballard Spahr LLP

(57) ABSTRACT

Disclosed herein is a footplate assembly for monitoring foot position in real time, as a wheelchair is driven. Optionally, the footplate assembly can use an array of force-sensing resistors and infrared distance sensors to detect the pressure and location of the foot within the immediate confines of the footplate. The footplate assembly can be provided as an overlay to an existing wheelchair footplate structure, or the (Continued)

footplate assembly can be integrated into or replace an existing wheelchair footplate structure.

29 Claims, 12 Drawing Sheets

(56) References Cited

U.S. PATENT DOCUMENTS

| | | | |
|---|---|---|---|
| 5,995,400 A | 11/1999 | Rincoe | |
| 6,257,610 B1 * | 7/2001 | Plant | A61G 5/02 180/315 |
| 6,474,753 B1 * | 11/2002 | Rieth | G05G 1/38 180/271 |
| 7,255,397 B2 * | 8/2007 | Olcheski | A61G 5/14 297/217.3 |
| 2002/0109390 A1 | 8/2002 | Hagiike | |
| 2010/0045454 A1 | 2/2010 | Knight | |
| 2011/0237398 A1 * | 9/2011 | Rubochkin | A63B 23/10 482/8 |
| 2014/0331412 A1 | 11/2014 | Stryker | |
| 2015/0061873 A1 | 3/2015 | Hyde | |
| 2016/0260311 A1 * | 9/2016 | Asano | G08B 25/014 |
| 2017/0185168 A1 | 6/2017 | Bonora et al. | |

OTHER PUBLICATIONS

International Search Authority Search Report for PCT/US2018/025872 dated Oct. 11, 2018.
International Search Authority Written Opinion for PCT/US2018/025872 dated Oct. 11, 2018.
International Search Authority Preliminary Report on Patentability for PCT/US2018/025872 dated Oct. 11, 2018.
EPO Extended Search Report for App No. 18781495.9; dated Dec. 17, 2020.

* cited by examiner

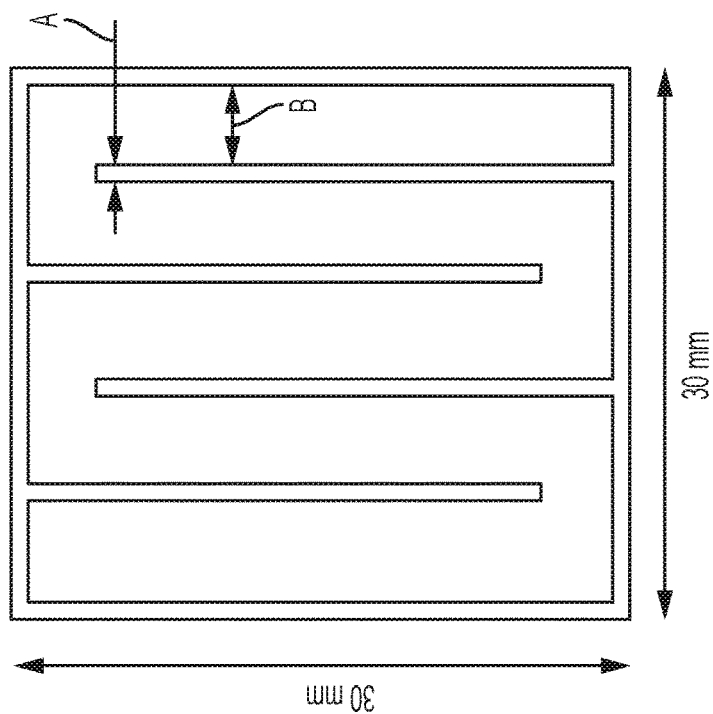
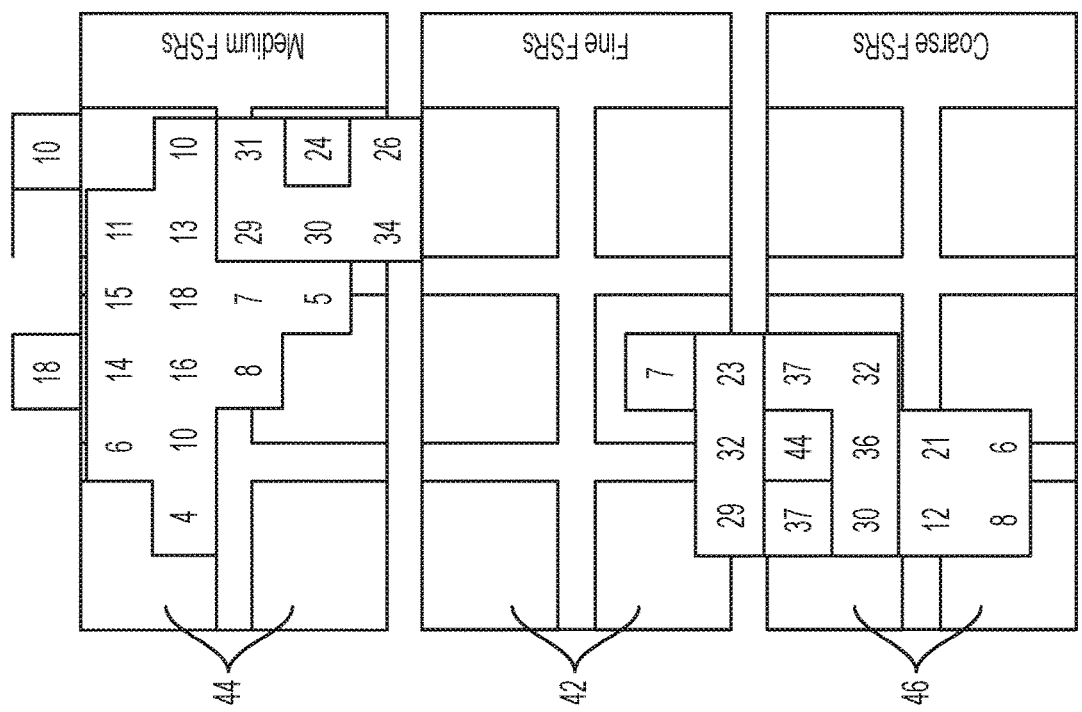
FIG. 4B
FIG. 4A

SMART FOOT POSITION SENSOR FOR POWER WHEELCHAIR USERS, AND SYSTEMS AND METHODS OF USING SAME

CROSS REFERENCE TO RELATED APPLICATIONS

This application is a national state filing under 35 U.S.C. § 371 of International Application No. PCT/US2018/025872, filed on Apr. 3, 2018, which claims the benefit of the filing dates of U.S. Provisional Application No. 62/480,804, which was filed on Apr. 3, 2017; and U.S. Provisional Application No. 62/485,666, which was filed on Apr. 14, 2017, the contents of which are incorporated herein by reference in their entireties.

STATEMENT REGARDING FEDERALLY SPONSORED RESEARCH

This invention was made with government support from the VA Innovators Network Program awarded by the Department of Veterans Affairs. The government has certain rights in the invention.

FIELD

This disclosure relates to footplate assemblies, and more particularly to footplate assemblies having sensors for monitoring foot position during wheelchair use. As further described herein, the footplate assemblies can be provided as overlays for positioning on a footplate structure or as components that are integrated into or function independently as a footplate structure.

BACKGROUND

Power wheelchair users with neurological deficits are at risk for severe injuries caused by incorrect foot positioning on the footplate. This can lead to collisions or foot dragging which are severe or life-threatening injuries for people with spinal cord injuries who cannot perceive their foot position. The foot cannot be safely immobilized due to the need to tilt for pressure relief to avoid pressure ulcers/injuries on the buttocks. Therefore, the foot can easily fall into a vulnerable position without the user realizing it.

Thus, there is a need for devices, systems and methods that address one or more of the deficiencies of the conventional wheelchairs as described herein.

SUMMARY

Disclosed herein, in various aspects, are footplate assemblies for monitoring foot position during wheelchair use. The foot plate assembly can include a base plate and a sensor subassembly. The base plate can define an upper surface and a bottom surface. The sensor subassembly can be secured to the upper surface of the base plate and define a contact surface for engagement with a foot. The sensor subassembly can comprise a plurality of force sensors configured to produce respective outputs indicative of force applied by the foot. The sensor subassembly can also include a plurality of proximity sensors configured to produce respective outputs indicative of a distance between the foot and the contact surface.

Optionally, the footplate assembly can have processing circuitry that is communicatively coupled to the plurality of force sensors and the plurality of proximity sensors to receive the outputs from the plurality of force sensors and the plurality of proximity sensors. The processing circuitry can be configured to produce an output indicative of a quality of contact between a foot and the contact surface of at least one footplate assembly. Systems and methods of using the footplate assemblies are also disclosed herein.

These and other features and advantages of the present invention will become more readily apparent when taken into consideration with the following description, the attached drawings, and the claims.

BRIEF DESCRIPTION OF THE DRAWINGS

FIG. 1A provides an illustration of an exemplary sensor subassembly having a plurality of force sensors and a plurality of proximity sensors secured to the upper surface of a base plate of the footplate assembly, as disclosed herein. FIG. 1B shows an exemplary footplate assembly having a coating structure. As shown, the coating structure can have overlay portions resting directly above a respective force sensor, and overcoat portions, with each overcoat portion being secured to a respective overlay portion and directly overlying a respective force sensor, as described herein.

FIG. 4A depicts an output from a higher resolution CONFORMat system overlaid with a footplate sensor array as disclosed herein. FIG. 4B provides expected pressure values for design of three variations of interdigitated force sensors as disclosed herein.

DETAILED DESCRIPTION

Figure 1A:
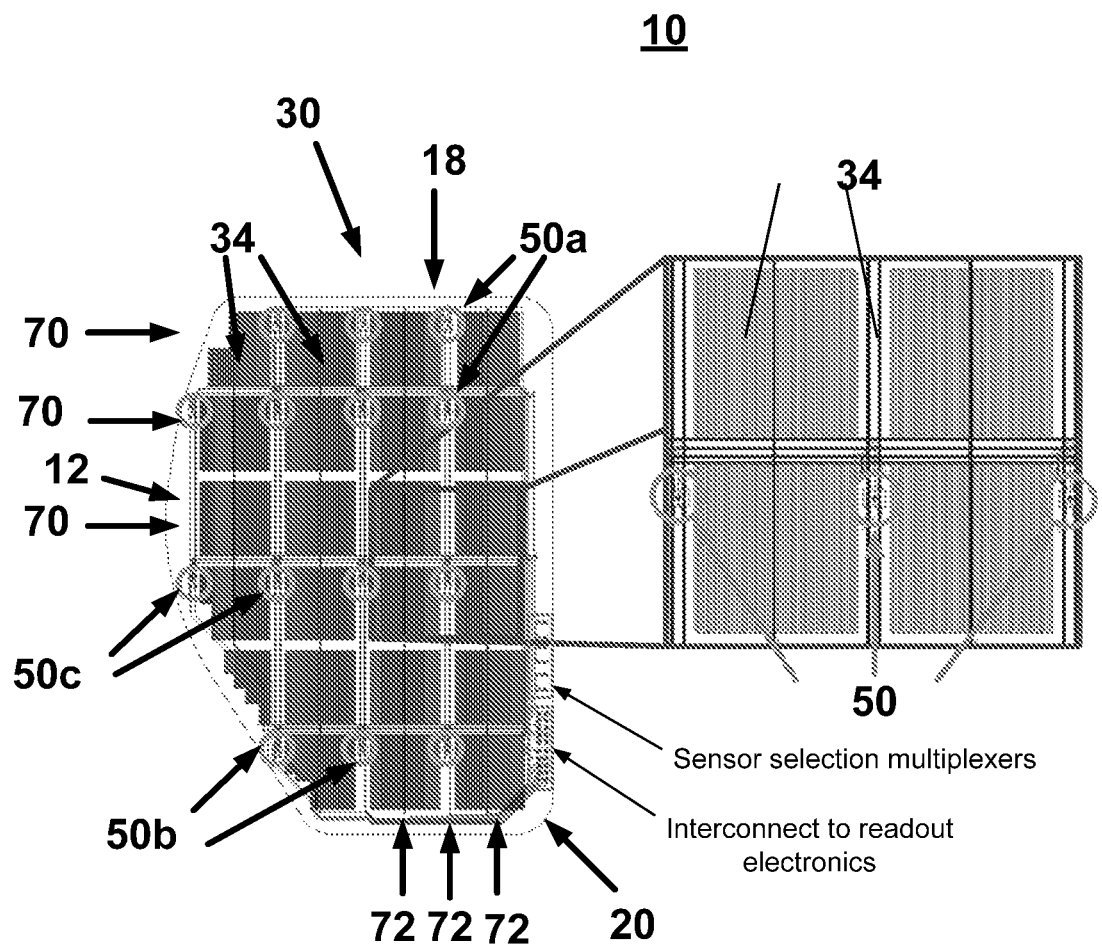
FIGS. 1A-B show an exemplary footplate assembly having an array of interdigitated force sensors (e.g., force-sensing resistors (FSRs)) and proximity/distance sensors (e.g., IR distance sensors) to determine shoe/foot position and pressure on the footplate. Distance sensors can sense regions of the shoe that are close to the footplate but not touching it, e.g. a mid-sole arch common in shoes.

The present disclosure can be understood more readily by reference to the following detailed description of the invention, the figures and the examples included herein.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, and the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

Definitions

As used in the specification and the appended claims, the singular forms "a," "an" and "the" include plural referents unless the context clearly dictates otherwise.

The word "or" as used herein means any one member of a particular list and also includes any combination of members of that list.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

Ranges can be expressed herein as from "about" or "approximately" one particular value, and/or to "about" or "approximately" another particular value. When such a range is expressed, a further aspect includes from the one particular value and/or to the other particular value. Similarly, when values are expressed as approximations, by use of the antecedent "about," or "approximately," it will be understood that the particular value forms a further aspect. It will be further understood that the endpoints of each of the ranges are significant both in relation to the other endpoint and independently of the other endpoint. It is also understood that there are a number of values disclosed herein and that each value is also herein disclosed as "about" that particular value in addition to the value itself. For example, if the value "10" is disclosed, then "about 10" is also disclosed. It is also understood that each unit between two particular units is also disclosed. For example, if 10 and 15 are disclosed, then 11, 12, 13, and 14 are also disclosed. Similarly, in some optional aspects, when values are approximated by use of the term "substantially," it is contemplated that values within up to 15%, up to 10%, or up to 5% (above or below) of the particular value can be included within the scope of those aspects.

As used herein, the terms "optional" or "optionally" mean that the subsequently described event or circumstance may or may not occur and that the description includes instances where said event or circumstance occurs and instances where it does not.

Disclosed herein, in various aspects, is an innovative approach to address an unmet need for subjects, for example, veterans, who are power wheelchair (PWC) users. There are no known individuals or manufacturers working on device development to provide foot position sensing for PWC users.

Introduction

Power wheelchairs (PWC) or complex rehab powerchairs provide mobility independence and improved quality of life for individuals with sensorimotor impairments, such as spinal cord injury/disorders (SCI/D) and sensorimotor impairments due to other neuromuscular disorders. To accomplish this, PWCs should be both compact and agile enough to use in the real world. Unfortunately, even well-configured PWCs can prove dangerous in daily community use by users who cannot easily feel or reposition their lower limbs (LL). Many conditions and activities of daily living (ADL), for example, driving over rough terrain in a PWC, can displace the feet from the footplates. Important pressure relief using tilt-in-space features also causes regular displacement of the feet as the footrests often extend away from the feet as the chair tilts backward. However, when the feet or lower limbs are incorrectly positioned on the wheelchair foot plate, injuries can occur due to pressure points or a foot dragging or colliding with obstacles. These devastating injuries often lead to prolonged hospitalization and have even caused death. Injury incidence from wheelchair use is poorly documented, but associated medical costs can be high. One study summarized wheelchair-related adverse reports to the FDA: most commonly fractures, then lacerations, and contusions/abrasions. Another study found that 47.5% of a chronic SCI cohort sustained tibia/fibula fractures requiring re-hospitalization: 6.7% were due to catching a lower extremity on a doorframe during wheelchair operation. These hospitalizations resulted in long stays, medical complications and often discharge to a nursing facility. Yet another study reported 54.7% of wheelchair users had at least one accident in the three year survey and 33% of PWC users reported accidental contact with obstacles. Foot pressure ulcer development during wheelchair use in people with SCI/D is poorly documented.

Technology for primary prevention of abrasions/contusions, pressure ulcers, and traumatic low-energy fractures due to foot misplacement is an unmet need for PWC users with sensorimotor deficits.

Complications of SCI/D Impacting PWC Use and Risk of Injury:

Individuals with SCI/D and other sensorimotor disorders such as stroke are at risk of complications including, for example, spasticity, contractures, and osteoporosis which increase vulnerability to PWC-related traumatic injuries. Persons with impaired lower extremity mobility are also prone to dependent edema and chronic venous stasis, leading to greater susceptibility to skin tears and pressure ulcer formation.

Spasticity is commonly a disabling complication of central nervous system (CNS) injuries. It presents as increased muscle tone and spasms, enhanced tendon reflexes and clonus, a rhythmic limb oscillation. Spasms are sudden involuntary contractions triggered by stimuli such as stretch of the involved muscle or even a light touch on the skin. Due to spastic muscles changing mechanical properties, contractures, fibrosis and atrophy are common after CNS injuries, leading to reduced range of motion. Foot and ankle contractures such as plantarflexion, inversion and equinovarus deformities are common. Plantarflexion can lead feet to slide off wheelchair footplates or cause forefoot pressure points. Varus foot positioning on the footplate may lead to pressure ulcers over the heel and lateral foot. Spasticity is dynamic and small changes in position, e.g., reclining the wheelchair backrest, can lead to sudden position changes via hip or knee extension or flexion spasms. Spasticity also fluctuates based on health status, neurological recovery, and ability to adhere to medication and stretching regimens. A person with a new SCI may leave the rehab hospital with a perfectly fitted wheelchair. However, if weight changes, spasticity and/or contractures can develop during recovery, seating and lower limb positioning can also change significantly during the months to years post-injury. Due to the practical and financial barriers to transportation to medical appointments, many people with SCI/D, particularly those using PWCs, may not see seating specialists or SCI/D-specialized physicians in time to treat the condition or adapt seating to avoid limb injury. Methods to remotely capture changes in seating and foot position earlier in the recovery process would be invaluable for prevention of later injuries related to incorrect foot positioning.

Fracture susceptibility is increased in persons with SCI/D and osteoporosis (OP), occurring during activities as benign as transfers and low speed PWC operation. Bone loss occurs rapidly below the level of SCI with most dramatic bone density changes occurring within two years post-SCI and is associated with a 5 to 23 fold increased fracture risk. Fractures after SCI occur principally at the proximal tibia and distal femur, due to reductions in bone mineral content, trabecular and cortical bone density, and torsional stiffness and strength. Low-energy fractures are a significant problem after SCI which is not easily remedied. Studies amongst 1137 adults with SCI have shown a discordance between the percentage reporting OP and the percentage receiving treatment. Avoiding high-risk situations predisposing to fracture, such as misplaced foot position, is desirable for PWC users.

Persons with sensorimotor impairments often become obese due to reduced activity. Obesity impedes visual detection of incorrect foot and limb positioning and may cause positional alterations as the user outgrows the wheelchair. Users may not see their limb in contact with an unintended surface, such as a wall or door frame, nor can they feel when their foot no longer contacts the footplate. There is also significant cognitive load required for constant attention to foot position due to disrupted sensory feedback from the limbs. These difficulties in detecting incorrect foot positioning are often compounded and users with SCI/D can easily sustain injuries with the foot in a vulnerable position.

Tissue health and venous return are often impaired in the lower limbs of persons with SCI. Dependent edema and chronic venous stasis often compound difficulties in detecting incorrect foot positioning. Persons with impaired lower extremity mobility are prone to skin tears and pressure ulcer formation.

Users with SCI/D can easily sustain severe, life-threatening injuries due to their feet and lower limbs being in a vulnerable position. This is an under-reported but widespread problem. There is currently no technology available for PWC users with sensorimotor deficits to enable primary prevention of traumatic low-energy fractures, abrasions/contusions, and pressure ulcers due to foot misplacement.

Veterans, for example, with SCI/D who were previously manual wheelchair users are increasingly transitioning to PWC use as they age due to factors such as the need to preserve upper extremity function. VA Informatics and Computing Infrastructure (VINCI) data indicates that the prescription of PWCs for veterans with SCI/D has increased dramatically, with an increase of nearly 60% within the past 3 years. PWC use allows mobility independence but there are concurrently increased challenges in configuring seating posture, including a high risk of incorrect/dangerous foot positioning during activities of daily living (ADL). The local Louis Stokes Cleveland Va. Medical Center (LSCVAMC) SCI/D population includes multiple individuals who sustained one or more lower limb injuries due to incorrect foot positioning. Injuries included lacerations/abrasions, tibial-fibula fractures and foot pressure ulcers.

PWC Design and Impact on Risk of Injury:

Specifications for a PWC are typically achieved by selecting the most appropriate model in a configuration that meets as many user needs as possible with the least number of concessions through considering the user's physical condition and living space, which often is not universally designed.

Previously, many PWCs had standard swing-away leg rests, which provide a wide space for foot and leg positioning with adjustable footrest angles to accommodate some varus deformities. However, these PWC designs are limited in compactness and durability and the lateral tubing components may contribute unwanted pressure points at the fibular heads for users with externally rotated hip position. Although swing-away leg rests are still in use, most modern models are equipped with a center-mount leg rest to improve maneuverability.

Center-mount leg rests provide shorter unit length and footprint, a tighter turning radius and, thus, improve maneuverability. On front-wheel drive models, center-mount designs provide good ergonomic functionality. Front-wheel drive footplates allow maximal surface area for foot positioning and include a gradual rounded raised lip for containment. Normal foot spacing and proper femur alignment is possible. The risk for the feet to come off the side of the footplate is relatively minimal. However, most designs do not extend the entire length of the average adult male foot. During close quarters' maneuvers, any toe contact with adjacent objects can shift the user's feet without their knowledge. Because an even smaller turning radius than front-wheel or rear-wheel drive powerbases is possible, most PWCs currently prescribed in the U.S. use a mid-wheel drive design. Footplate width is a concern on mid-wheel drive models with center-mount leg rests, unlike front-wheel drive models. For a mid-wheel drive powerbase to drive onto a platform lift or vehicle ramp, front casters can be about 11-12 inches apart when swiveled inward. This design limits footplate selection for center-mount leg rests on mid-wheel drive models. If selecting wider footplates for favorable positioning, the leg rests can be angled upward to clear the casters. This increases the effective length of the chair, its turning radius and the risk that the user's feet may contact the surrounding environment during tight maneuvers. This issue can be avoided by using a narrower footplate designed to fit between the front casters to reduce chair length, with a tradeoff that the user's feet may be less contained on the footplate.

Power wheelchair systems typically include a footplate that may not prevent a user's feet from contacting the ground or nearby objects, depending on common postures. Such PWC systems typically have a center-mounting post that limits foot positions other than flat on the footplate and prevents customization of inversion and eversion to adjust for joint contractures and spasticity. Additionally, without supplemental modifications, the center-mount footplate provides inadequate lateral support to prevent paretic lower limbs from externally rotating. This design limitation can be overcome through use of lateral thigh supports mounted on the seat. However, persons needing both lateral thigh supports and trunk support are limited by Medicare, which currently pays for one of these supplemental supports. Many PWCs also lack fore and aft calf-pad adjustability to support the lower leg, which increases instability in leg position if the user's feet come off the footplate.

Positioning in PWCs with power tilt and recline, which provide pressure relief if the user cannot weight shift, is dynamic due to wheelchair geometry changes during tilt and to spasms or gravity pulling the limbs off the footrest. When the chair is placed in tilt with the legrests extended for pressure relief and drainage of dependent edema, the center-mounting post lengthens as the hinge opens to prevent pushing the user back in the chair. The users' feet then commonly lose contact with the footplate. One study reported that in order to achieve effective restoration of blood flow, a tilt of 45°-60° is needed. At this extent of tilt, the user needs to fully elevate their leg rests, and the feet almost always lose contact with the footplate due to the posterior shift of the user in the seating system while the leg rests are at their maximum length. When the user returns to the upright position, it is quite likely that the feet will no longer sit squarely on the footplate. The hinge and hardware used to attach the footplate to the center-mounting post can take up 1.5-2 inches of the footplate length depending on manufacturer, and when the chair is tilted with elevated leg rests, the user's heels may rest on top of the hinge creating an unintended pressure point.

The use of toe cups and foot straps can hold the foot in place on footplate; however, positional fixation can cause additional problems. For example, if the biomechanics of a tilt or extensor spasms alter the foot position with toes secured there is a potential for fracture or other serious injury.

Disclosed herein is an early warning system of an unstable or unsafe foot-to-footplate interface important for prevention of lower limb injuries in PWC users with SCI/D and other neurological disorders causing osteoporosis, spasticity, contractures and susceptibility to impaired skin integrity. Preventing these adverse outcomes can benefit the patient as well as the medical system and society as a whole by decreasing medical costs and avoiding unnecessary lost productivity.

More particularly, disclosed herein are devices, systems, and methods that can be used to determine the foot's position in real-time during PWC use. The disclosed devices, systems, and methods can warn the user if the feet leave the safe confines of the footplates, or can communicate with the PWC control systems to slow or halt the chair to prevent injury. Also, disclosed herein is the design and testing of a prototype for use on PWC footplates and alerting users of mispositioned feet via a smartphone app. Throughout the following description, the terms "Footplate Pressure and Positioning Sensor" and "FoPPS" are understood to generally refer to the devices, systems, and methods for determining foot position as disclosed herein.

Footplate Assembly

Disclosed herein, in various aspects and with reference to FIGS. 1A-11, is a footplate assembly 10. In exemplary aspects, the footplate assembly 10 can comprise a base plate 12 and a sensor subassembly 30. In these aspects, the base plate 12 defines an upper surface 14 and a bottom surface 16. The base plate 12 can have a length that extends between toe and heel portions 18, 20 of the base plate 12. The sensor subassembly 30 can be secured to the upper surface 14 of the base plate 12 and define a contact surface 32 for engagement with a foot. Optionally, in some aspects, the base plate 12 can be configured to be directly secured to a support leg of a powered wheelchair (PWC) such that the footplate assembly 10 itself forms or is integrated into a footplate structure that is secured to the PWC. Alternatively, in other exemplary aspects, it is contemplated that the base plate 12 can be provided as an overlay that is placed or secured over a top surface of a substrate. In exemplary aspects, when the footplate assembly 10 is provided as an overlay, it is contemplated that the base plate of the overlay can be placed or secured over a top surface of a conventional PWC footplate structure 200 (see FIG. 12) that is already secured (or will be secured) to the support leg of a PWC. In these aspects, it is contemplated that the shape and dimensions of the footplate assembly 10 can be selected to match or be complementary to the shape and dimensions of the underlying footplate structure of the PWC. It is further contemplated that when the footplate assembly 10 is provided as an overlay, the overlay can be attached to the underlying PWC footplate using conventional attachment means, including for example and without limitation, adhesive, tape, hook-and-loop fasteners, or other conventional mechanical fasteners. However, it is also contemplated that, in some aspects, the overlay need not be secured to the underlying PWC footplate structure—for example, it is contemplated that the overlay can rest upon an upper surface of the PWC footplate structure without being secured.

In further aspects, and with reference to FIGS. 1A-1B, 3A, and 5A, the sensor subassembly 30 can include a plurality of force sensors 34 configured to produce respective outputs indicative of force applied by the foot 100. In still further aspects, the sensor subassembly 30 can include a plurality of proximity sensors 50 configured to produce respective outputs indicative of a distance between the foot (i.e., a bottom surface of the foot) and the contact surface 32 (generally corresponding to a measured distance between a bottom surface of the foot and a corresponding proximity sensor). It is contemplated that the sensor subassembly 30 can comprise an equal or unequal ratio of proximity sensors 50 to force sensors 34. In exemplary non-limiting aspects, it is contemplated the number of force sensors can be greater than the number of proximity sensors. Alternatively, in other exemplary aspects, it is contemplated that the number of proximity sensors can be greater than the number of force sensors. In use, it is contemplated that the outputs produced by the plurality of force sensors 34 and the plurality of proximity sensors 50 can provide information indicative of foot pressure changes on the footplate assembly 10 over time, which can indicate a risk of pressure ulcers or a poorly-fitted wheelchair. Additionally, the proximity sensors 50 can determine if the user's foot is frequently losing contact with the footplate assembly 10 during normal use, for example, bouncing up and down but staying within the footplate area, to prevent false alarms based on loss of contact pressure. In further aspects, it is contemplated that locations of the force sensors and proximity sensors can be selected to correspond to portions of the foot that are most likely to be indicative of a meaningful change in pressure or position.

Figure 1B:
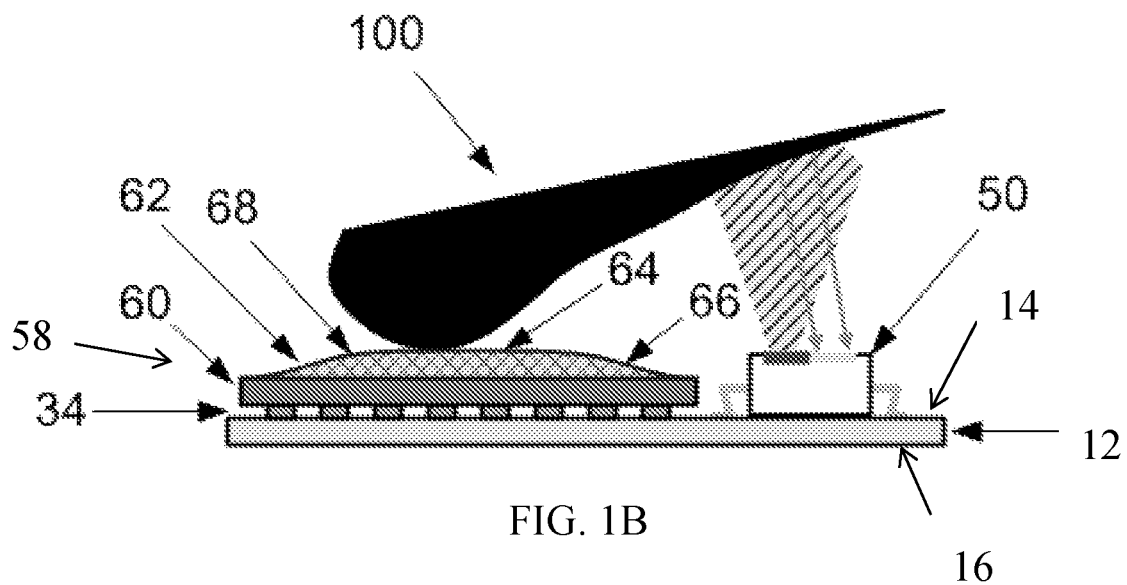
Figure 5A:
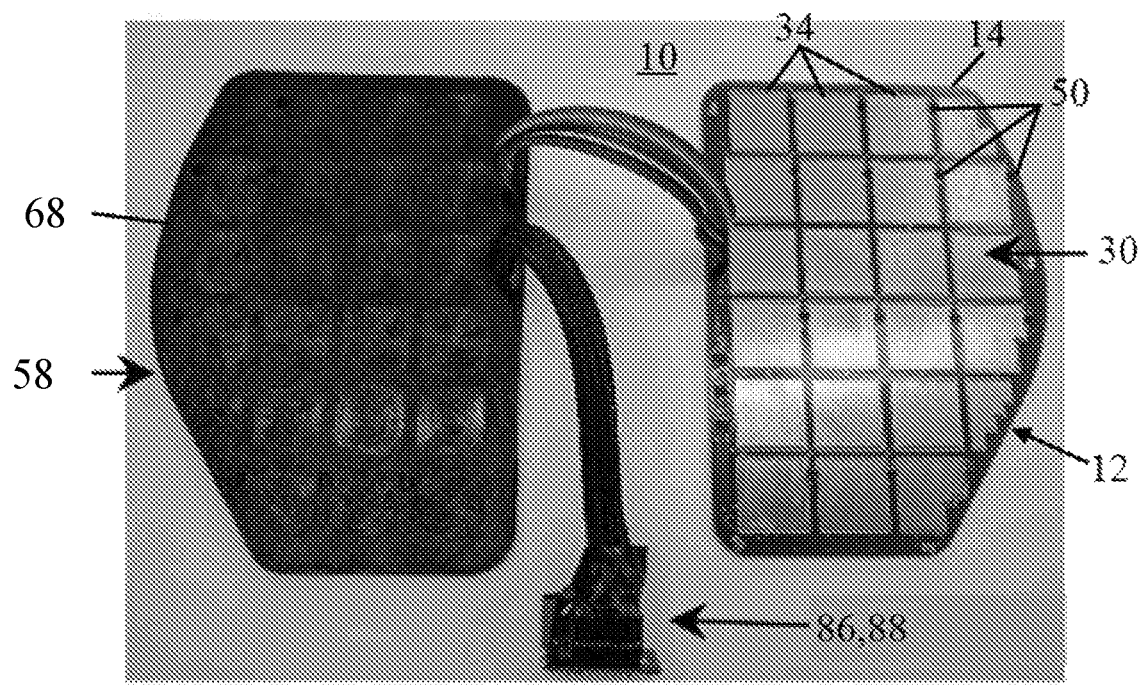
FIGS. 5A-B show fabricated and encapsulated sensor subassemblies, sized for use on standard PWC footplates, and with real-time data streaming to a smartphone for user notification of improper or unsafe foot position.
Figure 5B:
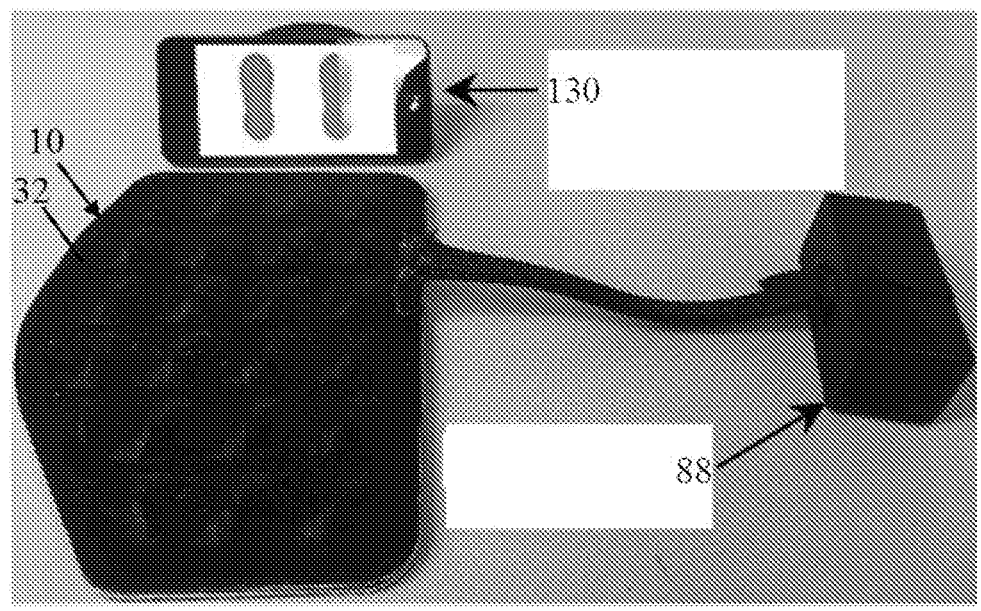

As depicted in FIGS. 1B and 5A-5B, in some exemplary aspects, the sensor subassembly 30 can further comprise a coating structure 58 that at least partially defines the contact surface 32. In these exemplary aspects, the coating structure 58 can comprise a plurality of overlay portions 60, each overlay portion resting directly above a respective force sensor 34 of the plurality of force sensors. Optionally, each overlay portion 60 can comprise a film, such as, for example and without limitation, a force-sensing resistor (FSR) film as is known in the art. A non-limiting example of a suitable FSR film is XactFSR film (Sensitronics, Bow, Wash.). Optionally, the surface area of each overlay portion 60 can generally match a surface area of an underlying force sensor 34. However, in other optional aspects, it is contemplated that the surface area of each overlay portion 60 can exceed the surface area of an underlying force sensor 34.

Additionally, in further exemplary aspects, the coating structure 58 can comprise an overcoat layer 68 having a plurality of overcoat portions 62. Optionally, in exemplary aspects, the overcoat layer 68 can be formed (printed) using a three-dimensional (3D) printer as is known in the art. In these aspects, it is contemplated that the overcoat layer 68 can be patterned to have a plurality of overcoat portions 62 as further disclosed herein. Each overcoat portion 62 can be secured to a respective overlay portion 60 and directly overlie a respective force sensor 34. Optionally, in some aspects, at least one overcoat portion of the plurality of overcoat portions 62 can have a center point 64 and a perimeter 66. In these aspects, a height of the overcoat portion at the center point 64 can be greater than a height of the overcoat portion at the perimeter 66, as shown in FIG. 1B. In other optional aspects, each overcoat portion of the plurality of overcoat portions 62 can have a center point 64 and a perimeter 66, with a height of each overcoat portion at the center point 64 being greater than a height of the overcoat portion at the perimeter 66. Optionally, the variation in height between the center point 64 of each overcoat portion and the perimeter region 66 of the overcoat portion can be about 2 mm, although other height variations are possible. More generally, it is contemplated that the operative height of each overcoat portion can vary along the upper surface of the overcoat portion, thereby defining a bump or projection. It is further contemplated that the portions of the overcoat portions having increased height (e.g., bumps or projections) can be positioned above a respective force sensor 34 and configured to act as a stress concentrator to ensure that pressure applied by the foot 100 of a patient is distributed onto the corresponding force sensor. Optionally, it is contemplated that each overlay portion 60 can be glued or otherwise secured (e.g., adhesively secured) to an underside of a corresponding overcoat portion 62 such that the overlay portion rests directly above a respective force sensor 34. Optionally, it is contemplated that the overcoat layer 68 (and the plurality of overcoat portions 62) can comprise a thermoplastic urethane (TPU) coating material, providing increased durability to the structure. Optionally, in another exemplary aspect, it is contemplated that the overcoat layer 68 (and the plurality of overcoat portions 62) can comprise a flexible polylactic acid (PLA) material such as Flex EcoPLA. More generally, it is contemplated that the overcoat layer 68 can comprise a material having at least a Shore 45D hardness or that otherwise has sufficient material durability to resist damage from contact with footwear. Optionally, in further exemplary aspects, it is contemplated that the overcoat layer 68 can comprise two separately three-dimensionally printed components corresponding to an upper component and a lower component, with the upper component comprising the plurality of overcoat portions and being shaped to complementarily overlie the upper portions of the footplate assembly and the lower component being shaped to complementarily receive the lower portions of the footplate assembly. In these aspects, it is contemplated that the upper and lower components of the overcoat layer 68 can be secured together using glue or other adhesive (e.g., silicone caulk) to completely surround and encapsulate the components of the footplate assembly 10. Optionally, in further exemplary aspects, it is contemplated that the upper component of the overcoat layer 68 can be formed with openings or gaps overlying the proximity sensors to avoid interference with the functionality of the proximity sensors. Optionally, in these aspects, the openings or gaps in the overcoat layer 68 can be filled or covered with optically clear material such as epoxy or silicone.

In further exemplary aspects, and with reference to FIGS. 3A-4B, the plurality of force sensors 34 can comprise a plurality of force-sensing resistors. Optionally, the plurality of force sensors 34 can comprise a plurality of square force-sensing resistors. Although force-sensing resistors are described in detail herein, it is contemplated that other force sensors can be employed within the disclosed sensor subassembly 30. For example, it is contemplated that the force sensors can comprise force-sensing capacitors, force-sensing inductors, force-sensitive oscillators, strain-sensitive, amorphous, crystalline or magnetic materials, or combinations thereof. In exemplary aspects, it is contemplated that the plurality of force sensors 34 can comprise at least two different types of force sensors selected from the types of force sensors outlined above.

Optionally, as shown in FIG. 4A, the plurality of square force-sensing resistors can comprise at least one "fine" force-sensing resistor 42, at least one "medium" force-sensing resistor 44, and at least one "coarse" force-sensing resistor 46. In exemplary aspects, it is contemplated that the "fine" force-sensing resistors 42, the "medium" force-sensing resistors 44, and the "coarse" force-sensing resistors 46 can all have similar structural layouts, with conductive/sensing material applied in the same or substantially the same pattern (see FIG. 4B, for example), with parallel (or substantially parallel) sections of conductive/sensing material being spaced apart by a selected separation distance. In these aspects, the selected separation distance of the "fine" force sensing resistors 42 can be less than the selected separation distance of the "medium" and "coarse" force-resisting resistors 44, 46, while the selected separation distance of the "coarse" force-resisting resistors 46 can be greater than the selected separation distances of the "fine" and "medium" force-sensing resistors 42, 44. Exemplary separation distances for the "fine," "medium," and "coarse" force-sensing resistors 42, 44, 46 are provided in Table 1 in the Examples section of the application. In further aspects, it is contemplated that the widths of the sections of conductive/sensing material can vary among the "fine," "medium," and "coarse" force-sensing resistors, with the widths being less for the "fine" force-sensing resistors than the "medium" and "coarse" force-sensing resistors and the widths being greater for the "coarse" force-sensing resistors than the "fine" and "medium" force-sensing resistors. Exemplary widths for the "fine," "medium," and "coarse" force-sensing resistors 42, 44, 46 are provided in Table 1 in the Examples section of the application. Optionally, the separation distances and the widths of the sensing material can be equal or substantially equal within each force-sensing resistor. In operation, it is understood the force sensor response can be defined by the width of the sensing elements and how close the sensing elements are to each other. Thus, it is contemplated that the plurality of force sensors can include sensors that provide different force sensor responses. Optionally, in exemplary aspects, due to the different sizing and spacing of the conductive material of these force-sensing resistors, it is contemplated that the "fine" force-sensing resistor 42 can have a first size, the "medium" force-sensing resistor 44 can have a second size larger than the first size, and the "coarse" force-sensing resistor can have a third size larger than the second size.

In additional exemplary aspects, the plurality of proximity sensors 50 can comprise a plurality of infrared distance sensors. Although infrared distance sensors are described in detail herein, it is contemplated that other distance or proximity sensors can be employed within the disclosed sensor subassembly 30. Other non-limiting examples of distance or proximity sensors that can be used as disclosed herein include optical distance sensors (e.g. laser, infrared, or optical noncoherent light sources), shadow sensors (e.g. blocking ambient light), thermoelectric or pyroelectric sensors, ultrasonic distance sensors, radar distance sensors, capacitive fringing field sensors. More generally, it is contemplated that any non-contact distance sensor can be used as disclosed herein. Optionally, in exemplary aspects, it is contemplated that the plurality of proximity sensors 50 can comprise at least two different types of distance or proximity sensors as listed above.

Figure 3A:
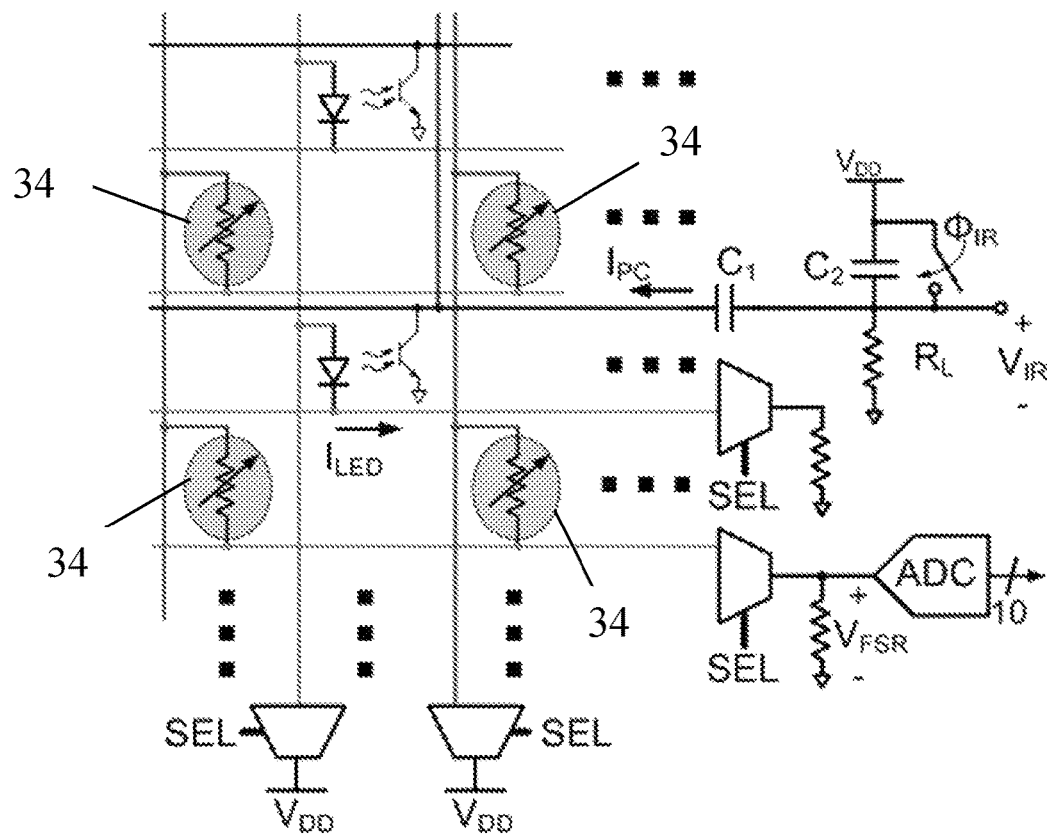
FIGS. 3A-B show an exemplary sensor array that uses a row-column framework for individual force sensor (e.g., FSR) measurement, with all IR phototransistor collectors sharing a common readout bus (FIG. 3A). The IR sensor readout can use an AC-coupled charge decay scheme, as shown in FIG. 3B. A correlated dual measurement can be made at each array site beginning with the IR LED turned off to measure the dark-state offset.
Figure 3B:
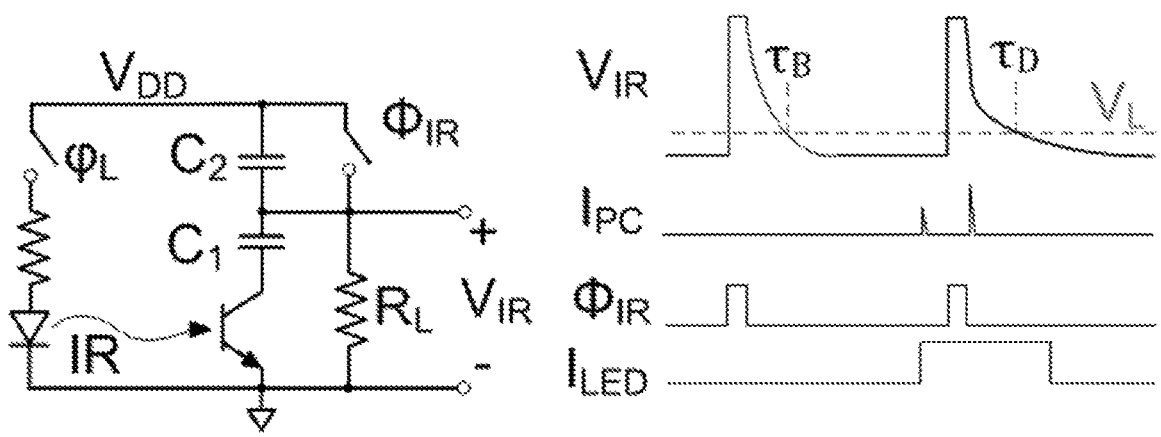
Figure 13:
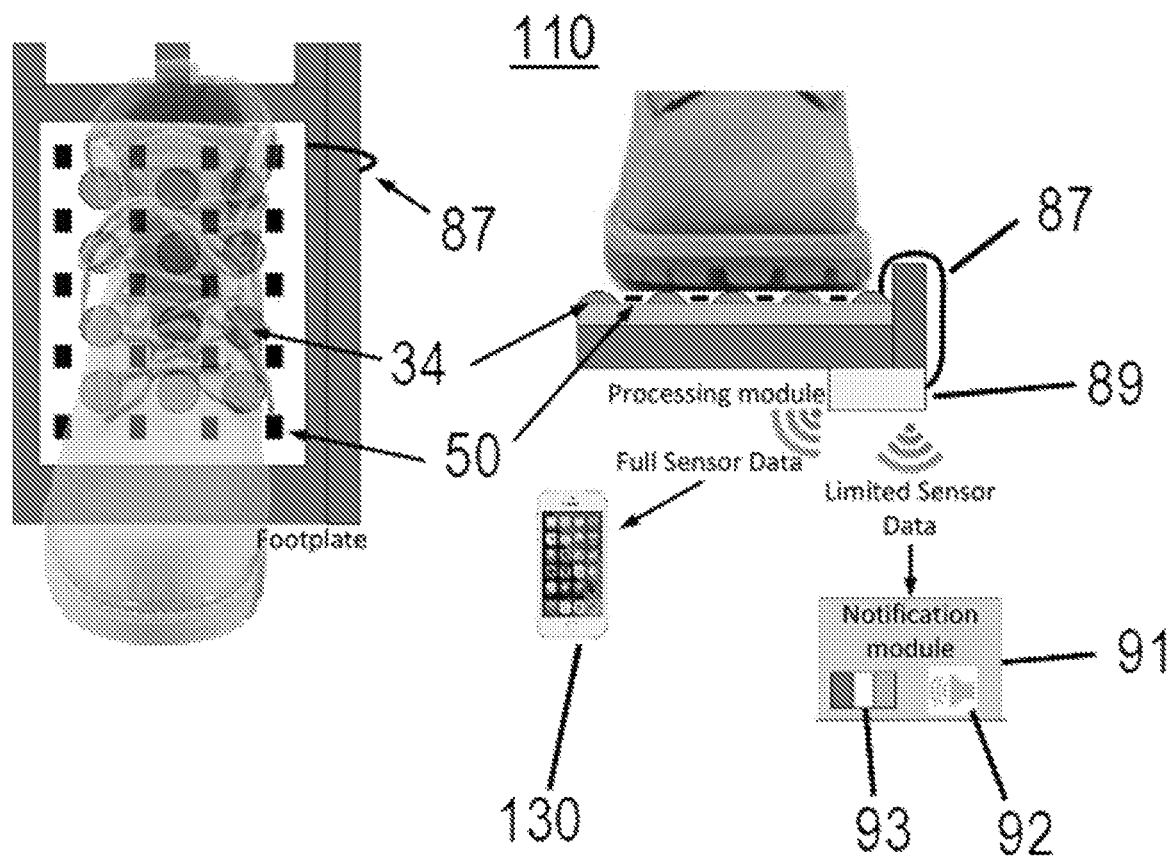
FIG. 13 is a schematic diagram depicting an exemplary system having a footplate assembly, processing circuitry, and a remote computing device as disclosed herein.

In further exemplary aspects, the plurality of force sensors 34 and the plurality of proximity sensors 50 can be arranged in a plurality of rows 70 and a plurality of columns 72 relative to the upper surface 14 of the base plate 12, as shown in FIGS. 1A, 3A, and 5A. The plurality of columns 72 can extend along the length of the base plate 12 and the plurality of rows 70 can extend perpendicularly or substantially perpendicularly to the plurality of columns 72. Optionally, in these aspects, the plurality of columns 72 can comprise a first plurality of columns comprising only force sensors 34 and a second plurality of columns comprising only proximity sensors 50. It is contemplated that the first and second pluralities of columns can be provided in an alternating arrangement. However, in other aspects, it is contemplated that two or more columns of the first plurality of columns or two or more columns of the second plurality of columns can be positioned adjacent one another. In exemplary aspects, at least a portion of the plurality of rows 70 (i.e., at least one row) can comprise at least one force sensor 34 (optionally, a plurality of force sensors) and at least one proximity sensor 50 (optionally, a plurality of proximity sensors). It is contemplated that the plurality of rows 70 can comprise at least four rows, and the plurality of columns 72 can comprises at least five columns. Optionally, as shown in FIG. 13, it is contemplated that the plurality of force sensors 34 and the plurality of proximity sensors 50 can be offset from one another such that each respective row 70 of the plurality of rows contains only force sensors or only proximity sensors and each respective column 72 of the plurality of columns contains only force sensors or only proximity sensors. Thus, in these configurations, no row or column contains both force sensors and proximity sensors.

Optionally, it is contemplated that, in exemplary aspects, the plurality of proximity sensors 50 can be distributed among a plurality of clusters that are spaced from other clusters (for example, spaced by at least one row). In exemplary non-limiting aspects, and as shown in FIG. 1A, the plurality of clusters can comprise a first cluster of proximity sensors 50a proximate the toe portion 18 of the base plate 12, a second cluster of proximity sensors 50b proximate the heel portion 20 of the base plate 12, and a third cluster of proximity sensors 50c spaced from and positioned between the first and second clusters.

Optionally, in further exemplary aspects, it is contemplated that the plurality of force sensors 34 can be uniformly or substantially uniformly distributed among the surface area of the base plate 12. However, it is contemplated that variations in spacing among the force sensors 34 can be permitted, such as when force sensors of multiple sizes are used within a single sensor subassembly 30.

In further exemplary aspects, the footplate assembly 10 can comprise processing circuitry 86 communicatively coupled to the plurality of force sensors 34 and the plurality of proximity sensors 50 to receive the outputs from the plurality of force sensors 34 and the plurality of proximity sensors 50 (see FIGS. 5A, 5B, 11, and 13). In these aspects, the processing circuitry 86 can be configured to produce a user-observable output such as an audible, visual, or vibrational output indicative of a quality of contact between a foot 100 and the contact surface 32 of at least one footplate assembly 10. As used herein, it is understood that the term "contact between a foot" can include contact between footwear and the contact surface (i.e., direct contact with the foot of the wheelchair user is not required). In exemplary aspects, the processing circuitry can function as an integrated circuit. In other exemplary aspects, the sensor subassembly 30 and at least portions of the processing circuitry can be embedded in or otherwise secured to the footplate assembly 10. Alternatively, as shown in FIG. 13, it is contemplated that at least a portion of the processing circuitry 86 can be provided in a processing module 89 that is not physically associated with the footplate assembly 10. For example, it is contemplated that the processing module 89 can be secured to a portion of the wheelchair 120 and positioned in electrical communication with the sensor subassembly 30 using a cable 87 as shown in FIG. 13.

In one aspect, the processing circuitry can comprise at least one memory in operative communication with the plurality of force sensors 34 and/or the plurality of proximity sensors 50 of the footplate assembly 10. In this aspect, it is contemplated that the at least one memory can be configured to receive and store the outputs from the plurality of force sensors 34 and/or the plurality of proximity sensors 50 of the footplate assembly 10. In some aspects, the at least one memory can be coupled to the footplate assembly 10. However, in other alternative aspects, it is contemplated that the at least one memory can be positioned at a remote location from the user.

In some optional aspects, the processing circuitry can comprise a microcontroller 88 in operative communication with one or more components of the processing circuitry 86. In these aspects, it is contemplated that the microcontroller 88 can comprise hardware and software that are configured to control the operation of the components of the processing circuitry in operative communication with the microcontroller 88. For example, it is contemplated that the microcontroller 88 can be configured to initiate transmission of outputs stored on the at least one memory.

In another aspect, the processing circuitry 86 can comprise at least one wireless transmitter 90, such as a wireless transceiver as is known in the art. An exemplary non-limiting example of the wireless transmitter 90 includes a Bluetooth® enabled wireless radio, such as a Bluetooth Low Energy (BLE) 4.1 radio; however, it is contemplated that any suitable wireless transmitter can be used. It is contemplated that the at least one wireless transmitter 90 can be in operative wireless communication with the microcontroller 88 and/or the at least one memory of the processing circuitry 86. In this aspect, it is contemplated that the at least one wireless transmitter 90 can be configured to wirelessly transmit one or more outputs from the sensors 34, 50 received by the microcontroller 88 or stored on the at least one memory. Although a wireless transmitter is preferred, it is contemplated that the at least one memory and the plurality of force sensors 34 and proximity sensors 50 can be connected to one another by a conventional hard-wired connection. Optionally, the disclosed wireless transmitter 90 can be provided within a processing module 89 as further disclosed herein.

In exemplary aspects, the microcontroller 88 can be positioned in operative communication with the at least one wireless transmitter 90. In these aspects, it is contemplated that the microcontroller 88 can optionally be configured to selectively transmit the stored outputs (following analog-to-digital conversion, as appropriate) of the force sensors 34 and/or the proximity sensors 50 to a server, which, in some aspects, can be in communication with a wireless receiver. It is further contemplated that the server can be positioned remotely from the user. In exemplary aspects, the server can be provided as part of a computer having a processor and a memory in operative communication with the processor. Optionally, it is contemplated that the processor of the computer can initiate transmission of the stored outputs of the force sensors 34 and/or the proximity sensors 50 to the server.

In an additional aspect, it is contemplated that the processing circuitry can comprise an analog-to-digital converter as is conventionally known in the art. In this aspect, it is contemplated that the analog-to-digital converter can be operatively coupled to and positioned between the plurality of force sensors 34 and the at least one memory and/or the plurality of proximity sensors 50 and the at least one memory. It is further contemplated that the analog-to-digital converter can be configured to receive the outputs of the plurality of force sensors 34 and/or the plurality of proximity sensors 50 and convert the various signals and outputs into corresponding digital signals configured for further processing by the processing circuitry.

In further exemplary aspects, it is contemplated that the processing circuitry 86 can comprise means for generating the user-observable output disclosed herein such as an alarm in response to one or more of the output signals of the plurality of force sensors 34 and/or the plurality of proximity sensors 50. In these aspects, it is contemplated that the means for generating an alarm can comprise a conventional device for selectively generating optical, thermal, visual, vibrational, and/or audible alarm signals. Specific non-limiting examples are disclosed below. In additional exemplary aspects, it is contemplated that the processing circuitry can be configured to identify an alarm condition corresponding to a threshold value of one or more of the output signals of the force sensors 34 and/or the proximity sensors 50. In these aspects, it is contemplated that the processing circuitry can be configured to generate an alarm in response to the alarm condition.

Optionally, in one exemplary aspect, the alarm condition can be triggered when the foot has not made contact with the footplate assembly 10 for a predetermined amount of time. Optionally, in one exemplary aspect, the alarm condition can be triggered when a threshold distance between the contact surface 32 of the footplate assembly 10 and the foot (measured from the footplate assembly 10 and reflected in the plurality of proximity sensor output signals) is reached. In another optional exemplary aspect, the alarm condition can be triggered when a threshold force (measured from the footplate assembly 10 and reflected in the plurality of force sensor output signals) is reached. It is contemplated that the various alarm conditions can be identified with a conventional greater-than-less-than trigger with a requirement that a predetermined threshold value be surpassed for a selected period of time before the actual trigger is activated, thereby avoiding spurious triggers.

Optionally, in another exemplary aspect, the means for generating an alarm can comprise at least one visual indicator, such as, for example and without limitation, a light emitting diode or other selectively illuminated indicator. In this aspect, it is contemplated that the at least one visual indicator can be activated (illuminated) in response to an alarm condition as described herein. For example, as shown in FIG. 13, it is contemplated that the processing module 89 can be communicatively coupled (optionally, wirelessly coupled through a WiFi or Bluetooth connection) to a notification module 91 that is operatively associated with the wheelchair 120 or footplate assembly 10. In exemplary aspects, the notification module 91 can comprise the at least one visual indicator 93. In further exemplary aspects, and with reference to FIG. 13, the means for generating an alarm can comprise a sound output module 92, which can optionally be provided as part of the notification module 91. In these aspects, it is contemplated that the sound output module 92 can be activated to generate an audible alarm output in response to an alarm condition as described herein. It is further contemplated that the sound output module 92 can comprise a speaker and other conventional hardware that is configured to produce a selected, pre-programmed audio output in response to receipt of the alarm condition.

It is contemplated that the way in which the data generated from the output signals data is stored and recovered can significantly impact the complexity, size and power requirements of the device. For example, it is contemplated that storing the data for downloading using a hardwire connection at a later time can significantly reduce the complexity, size and power requirements of the footplate assembly electronics.

Figure 11:
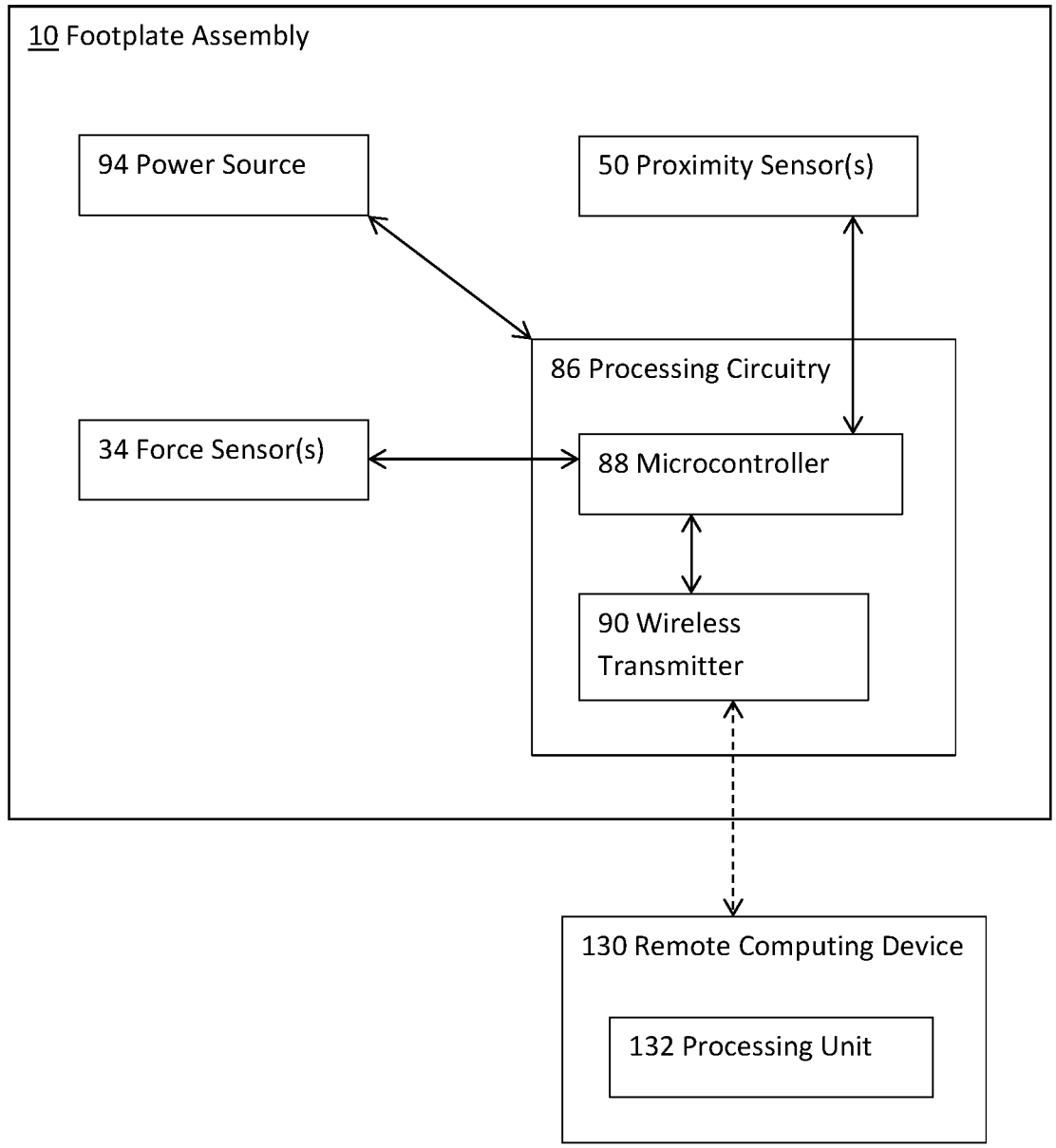
FIG. 11 is a schematic diagram depicting communication among components of an exemplary system including a footplate assembly and a remote computing device as disclosed herein.

As shown in FIG. 11, it is further contemplated that the footplate assembly 10 can comprise a power source 94 configured to provide power to the footplate assembly 10. In this aspect, the power source 94 can be in operative communication with the processing circuitry 86 such that the power source 94 is configured to power the force sensors 34, and/or proximity sensors 50 of the footplate assembly 10 and the processing circuitry. It is contemplated that the power source 94 can be a conventional battery, capacitor, or electromagnetic power source. Optionally, it is further contemplated that the at least one power source 94 can be rechargeable through a first port (not shown) defined in the footplate assembly 10 or wheelchair 120. It is still further contemplated that the power source 94 can be removable and replaceable. In an exemplary aspect, it is contemplated that the power source 94 can be an electric generator that is powered by mechanical energy received from the user. In this aspect, it is contemplated that the electric generator can be configured to convert mechanical energy applied to the footplate assembly 10 by the user into electrical energy. It is contemplated that the electric generator can optionally be a piezoelectric generator comprising one or more materials that exhibit the piezoelectric effect, such as, for example and without limitation, quartz. When coupled with appropriate circuitry, it is contemplated that such piezoelectric generators can be configured to generate electrical energy from cyclic mechanical strain.

Footplate System

Figure 12:
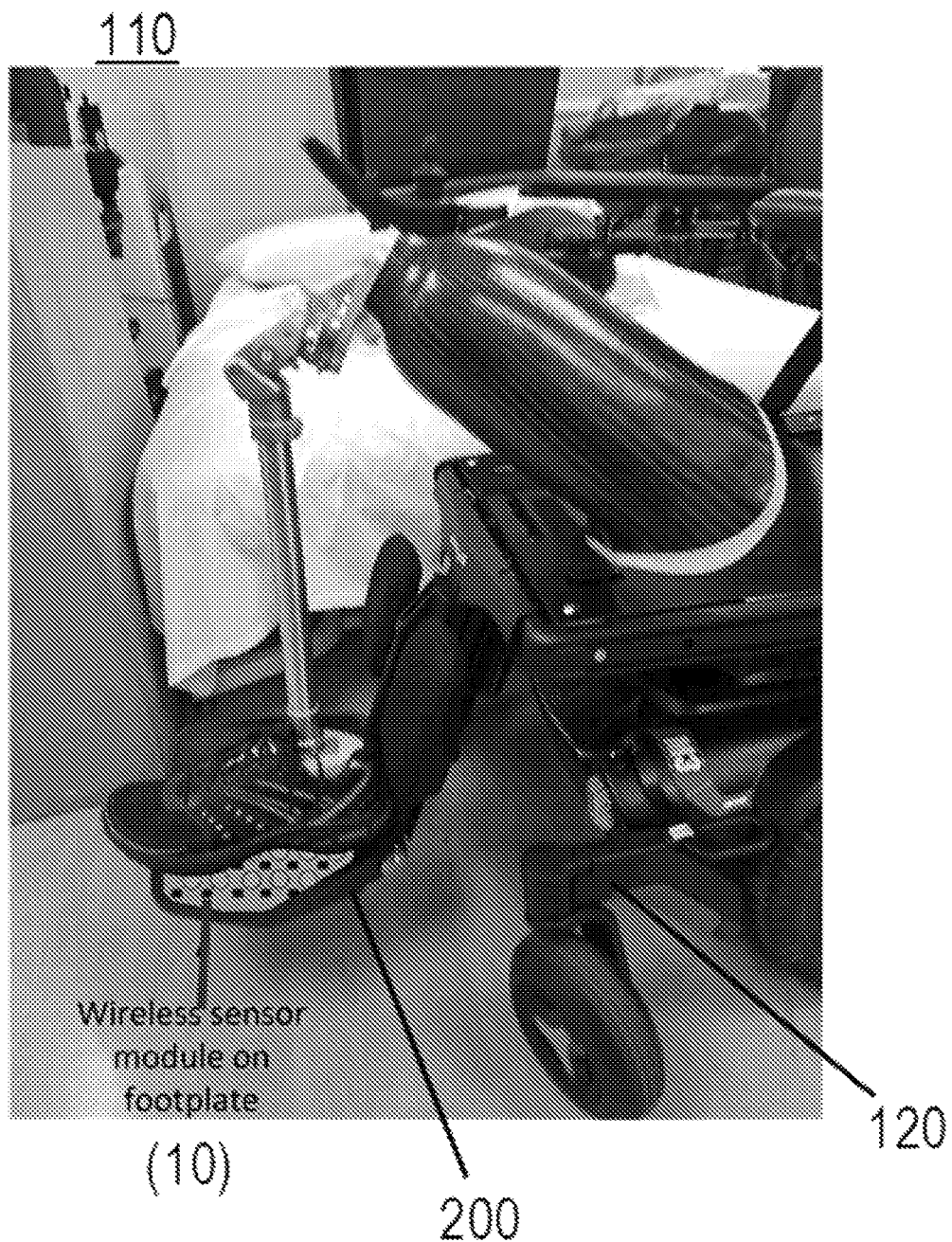
FIG. 12 depicts an exemplary experimental arrangement in which a footplate assembly is provided as an overlay positioned over a conventional footplate structure of a wheelchair.

Also disclosed herein with reference to FIGS. 11-13 is a system 110 that includes a wheelchair 120 having at least one footplate assembly 10 (optionally, a bilateral footplate assembly or two footplate assemblies), as disclosed herein. In exemplary aspects, the at least one footplate assembly can have processing circuitry 86 that is communicatively coupled to the plurality of force sensors 34 and the plurality of proximity sensors 50 to receive the outputs from the plurality of force sensors 34 and the plurality of proximity sensors 50. In these aspects, the processing circuitry 86 is configured to produce an output indicative of a quality of contact between a foot and the contact surface of at least one of the two footplate assemblies 10. Optionally, in these aspects, the output of the processing circuitry 86 can correspond to the respective outputs received from the force sensors 34 and the proximity sensors 50.

In further exemplary aspects, the system 110 can include a remote computing device 130, such as a computer, a tablet, a smartphone, or the like, that has a processing unit 132 that is in wireless communication with the processing circuitry 86 of the at least one footplate assembly. As further disclosed herein, the processing unit 132 of the remote computing device 130 can be configured to analyze the output(s) received from the processing circuitry of the at least one footplate assembly and determine a quality of contact between the foot of a patient and a respective footplate assembly. In exemplary aspects, the processing unit 132 of the remote computing device 130 can be configured to produce an output such as a visual, vibrational, or audible output indicative of a quality of contact between a foot and the contact surface 32 of at least one of the footplate assemblies 10. Optionally, in these aspects, the remote computing device can be a smartphone or tablet, and the processing unit 132 of the smartphone or tablet can be configured to execute an application that is configured to produce at least one visual output on a display of the smartphone or tablet. Additionally, or alternatively, it is contemplated that the processing unit 132 can be configured to produce an audible output using the speakers of the smartphone or tablet. Additionally, or alternatively, it is contemplated that the processing unit 132 can be configured to produce a vibrational alarm using the vibrational motor controls of the smartphone or tablet.

Method of Using the Footplate Assembly

Further disclosed herein are methods of using the disclosed devices 10 and systems 110. In one aspect, a subject can use a wheelchair 120 having at least one footplate assembly 10 (e.g., two footplates) as described herein. As further described herein, the at least one footplate assembly 10 can have processing circuitry 86 that is communicatively coupled to the plurality of force sensors 34 and the plurality of proximity sensors 50. In this aspect, the method can further include using the processing circuitry 86 to receive the outputs from the plurality of force sensors 34 and the plurality of proximity sensors 50. As described in more detail herein, the processing circuitry can produce a user-observable output indicative of a quality of contact between a foot and the contact surface 32 of at least one of the two footplate assemblies 10.

In exemplary aspects, the method can further include using the processing circuitry 86 to wirelessly transmit to the remote computing device 130 information indicative of the outputs from the plurality of force sensors 34 and the plurality of proximity sensors 50. Optionally, in some exemplary aspects, the method can also include using a processing unit 132 of the remote computing device 130 to produce an output such as a visual, vibrational, or audible output indicative of a quality of contact between a foot and the contact surface 32 of at least one of the footplate assemblies 10.

Figure 2:
FIG. 2 illustrates an exemplary user interface for the disclosed footplate system with a visual alert showing foot position status as disclosed herein.

Optionally, as further disclosed herein, the remote computing device 130 can be configured to run an application ("app") having software that, when executed by the processing unit off the remote computing device, can produce an output indicative of the quality of contact between a foot and the contact surface 32 of at least one footplate assembly 10. Optionally, the output can comprise an alert or warning as further disclosed herein. In exemplary aspects, in order to minimize power drainage, the app can use sleep/sniff operation. Specifically, the app can be configured to sleep, power up at a selected frequency (e.g., every 2 seconds) to listen to the wireless transmitter of the device, and then go back to sleep unless an improper positioning event occurs. In such a case, an alert can sound using visual, audio and/or vibration notification to notify the user that their foot is improperly positioned (FIG. 2). Optionally, a moderate-intensity alert can sound when the foot is misplaced and a more urgent (higher intensity) alarm can sound if the foot is entirely off the footplate. The user can have the option to select the mode or modes of alert and alarm notifications including visual, audio and/or vibration. A moderate audiovisual alert can inform the user that their foot is incorrectly positioned on the footplate, while a more urgent alarm can be triggered if the foot is entirely off the footplate. In addition to providing real-time foot positioning feedback to the PWC user, data records may be downloaded by clinicians to better understand positioning risks. For example, as further disclosed herein, the processing circuitry 86 of the footplate assembly 10 can be configured to upload recorded data to a server or computer, either through wireless communication or through a port or bus. After the recorded data is on the server, it is contemplated that a clinician can access the data through either direct (wired network) server or computer access or via Cloud-based server/computer access. The average current usage using BLE 4.0 sleep/sniff communication is 1 μA, with a peak use during active notification of up to 15 mA. Local storage of position and force data can be provided together with the capability to send regular updates to the clinical team on changes in the frequency of incorrect foot positioning to permit monitoring of evolving issues. This low data rate BLE scheme can have a relatively minor impact on battery life, drawing far less power than wireless music streaming and navigation tasks, which are routinely handled by modern mobile platforms.

Figure 8A:
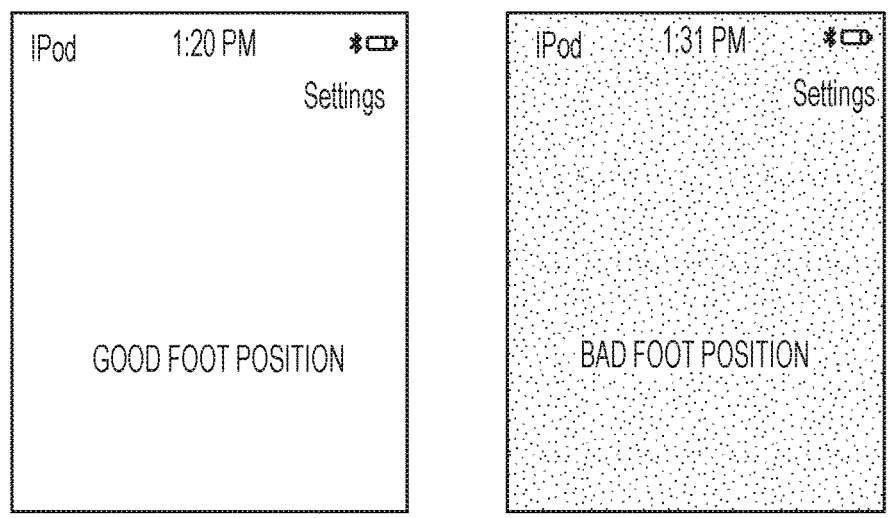
FIGS. 8A-B show an exemplary output of a remote computing device with a prosthetic shoe on a left footplate. The output can be provided in the form of an executable application that can be configured to effect a display of three screens for user notification: overall status (FIG. 8A), a live pressure and measured IR distance map (FIG. 8B), and a visual status for each footplate (FIG. 8C).
Figure 8B:
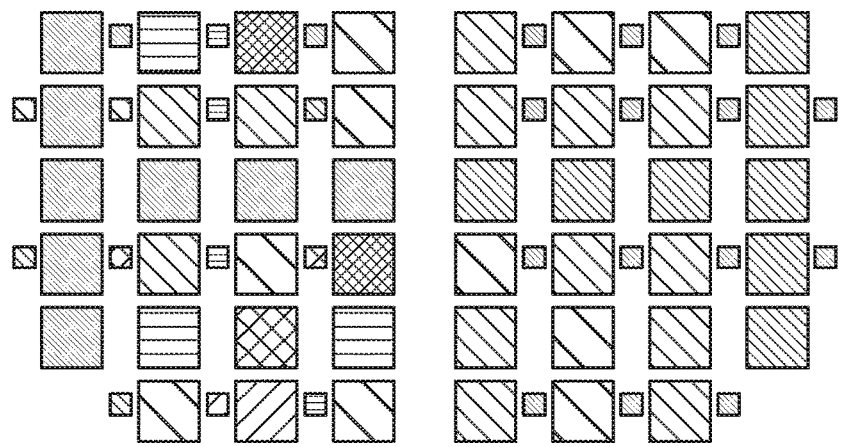
Figure 8C:
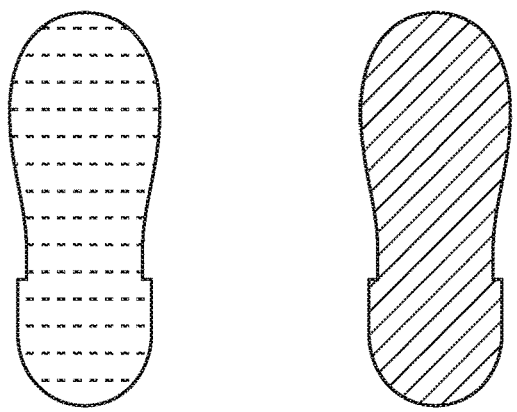
Figure 9:
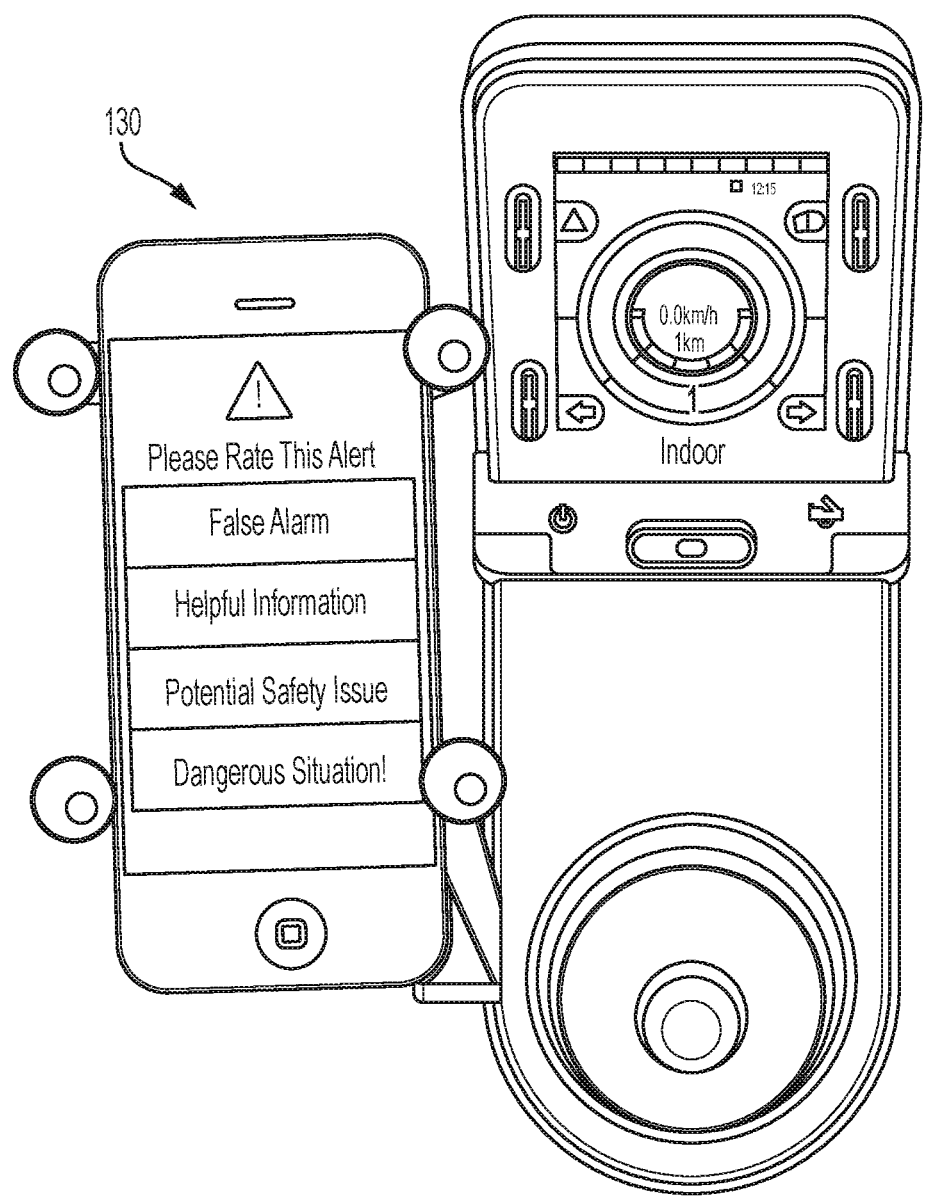
FIG. 9 shows an example of a user interface including alert rating options as disclosed herein.

More specifically, sensor data can be received by a custom iOS app running on an iPhone 6 or an iPod Touch. The app can be configured to simulate real-time detection of foot position to provide feedback and warnings to users. The app has three user interfaces (FIGS. 8A-8C) designed to be simple to interpret for PWC users who might be distracted by activities of daily living. For example, as shown in FIGS. 8A-8C, the app can produce: a first user interface with a color-coded text alert stating the quality of foot position ("good," "bad," etc.); a second user interface with a color-coded grid corresponding to the outputs at the locations of the sensors of the sensor subassembly; and a third user interface with a color coded visual depiction of a shoe, with each color corresponding to the quality of foot position (e.g., "good"=black or no color; "bad"=red). The app can receive sensor frames as disclosed herein and process them to determine if the user should be alerted of a dangerous or improper foot position. The app can be programmed to average the footplate pressure values and alert the user if the weighted sensor values are below a threshold.

Optionally, in addition to including force sensors and proximity sensors, it is contemplated that the disclosed system can include at least one of an accelerometer, a gyroscope, or a GPS sensor. Optionally, it is contemplated that the remote computing device disclosed herein can be mounted to the wheelchair such that the smartphone can use its onboard sensors (accelerometer, gyroscope, and GPS) to describe the chair's motion in space: inclination, rotational velocity, and ground-truth velocity (derived from GPS data). The footplate and smartphone accelerometers can be used to determine if the user is tilting or reclining the chair as opposed to moving up or down a ramp. Thus, in combination with the sensors of the sensor subassembly as disclosed herein, the system can transmit 2D force distribution, 2D infrared distance to foot, and footplate inclination relative to gravity data to the smartphone app. It is contemplated that all data channels collected can be used in post hoc analysis for algorithm determination to warn users of impending foot motion based on chair dynamics as further disclosed herein.

EXAMPLES

Example 1: Footplate Pressure and Positioning Sensor

Disclosed herein is a footplate pressure and positioning sensor (FoPPS) device combined with a FSR/IR sensor array (FIG. 1A) as disclosed herein. The disclosed system can permit accurate monitoring of both foot position and force distribution with wireless communication technology for real-time monitoring of the magnitude and distribution of forces on the footplate and the proximity of objects around the footplate (FIG. 2). The system described herein uses a Universal Design approach which can be portable among multiple wheelchair manufacturers and footplate designs. The user's smartphone interface can include, for example, options for visual, audio and/or vibration notifications to enhance responsiveness to system alerts and can permit information on foot position in community use to be provided to clinical end-users. It is contemplated that the disclosed footplate assemblies and systems can provide early indicators of pressure ulcer risk due to persistent foot malposition.

Sensor Architecture. Foot position can be detected relative to the footplate with many sensor modalities. To accommodate a wide range of footwear, be cost-effective, and increase the environmental resilience of the disclosed devices and systems, a simple architecture was adopted consisting of an array of force-sensing resistors and infrared distance sensors.

As shown in FIG. 1B, this topology can be economical and durable when overcoated with water- and abrasion-proof thermoplastic urethane (TPU) coatings. The force-sensing device disclosed herein has additional clinical utility, because it can determine if a user's foot pressures are changing over time, which might indicate pressure ulcer risk or a poorly-fitted PWC. The IR sensors can determine if a person's foot 100 is frequently losing contact with the footplate during normal use, e.g. bouncing up and down but staying within the footplate area, to prevent false alarms based on loss of contact pressure.

The system disclosed herein can comprise a flexible additively manufactured seamlessly encapsulated force sensor array to monitor and report physiologically appropriate footplate loading and foot position. It is contemplated that the use of Flex EcoPLA, a flexible polylactic acid (PLA) material with a Shore 45D hardness, or other similar material as disclosed herein to encapsulate the active sensing and communication components can provide robustness, humidity and temperature resistance during use. An adhesive base layer can attach the sensor subassembly securely to the footplate for monitoring of the magnitude and distribution of forces.

Footplate-scale sensor arrays. There have been several studies on forces acting through the seat base and backrest in wheelchairs but there is limited information on the range of forces applied to the footplate by PWC users during normal use. As described herein, the force sensor range required for the disclosed devices and systems was determined, and the footplate interface force magnitude and distribution was assessed using Flexiforce force-sensing resistors (Tekscan Inc.) placed under the forefoot, the lateral and the medial aspects of the midfoot and the heel.

To aid in the design of FSRs capable of sensing the full range of expected pressures, subjects were seated upright in a chair with their feet resting on a CONFORMat (Tekscan Inc., Boston, Mass.) pressure sensor mat, which comprises a 14.7 mm² array of over 1,000 sensels (individual sensing elements). The highest pressures were observed under the heel at 1.3 psi. Less pressure was observed under the forefoot, and little, if any, pressure was observed under the midfoot. Expected pressure values were adjusted by a safety factor of 150% to accommodate heavier users.

To determine the pressure difference between the heel, midfoot, and forefoot, the disclosed sensor subassembly can use three FSR types (FIG. 4A). To balance refresh rate and cost with pressure map accuracy, the FSRs on the disclosed sensor subassembly were 30 mm squares, spaced 10 mm between edges. This sensor density still provides ample resolution to find high- or low-pressure areas when compared to the higher-resolution CONFORMat sensor (FIG. 4A). The IR sensors used to infer distance from the footplate are placed in columns between the FSRs (FIG. 1A).

Sensor array readout electronics. In the disclosed system, the outcomes can include changes in relative applied force due to foot misplacement on the footplate. In ADL, it is expected that small changes in foot positioning and force due to vibration during driving can be relatively frequent and quick. These high temporal rate and low spatial magnitude changes can cause force reductions without full off-loading. Changes in footplate loading due to periodic tilt-in-space pressure relief procedures can also cause force reductions without full off-loading. In this case, change in footplate forces can be expected to be slow, with a varying degree of positional change. Misplacement of the feet can be exhibited as large changes in footplate force with no change over time. Total loss of foot contact can be rarer and cause a reduction of applied force to zero.

Benchtop testing can be carried out to characterize changes in resistance under cyclic and sustained applied loads representative of physiological loading regimes during ADL. Ten FSRs were additively manufactured and tested. The effects of tilt-in-space changes in foot placement can be evaluated by applying loads to 100% predicted footplate load for 30 minutes, ramped down to 60% for 10 minutes, and then ramped back up to 100%. The cycle can be repeated 15 times to represent a daily weight shifting regime for a PWC user. The effect of sustained loading during sitting with misplacement and rare loss of total foot placement can be evaluated by applying loads to 100% predicted footplate load for 10 hours, stepped down to 80% for 30 minutes, stepped back to 100% for a further 1.5 hours before being immediately off-loaded. The step-down and off-loading can mimic incorrect positioning and the foot falling off the footplate. The load cycle can then be repeated after 12 hours off-loading for a total of 5 days, to mimic 5 days of real-life use. Resistance can be monitored every 10 minutes throughout the load cycle.

To ensure a low profile overall and maintain flexibility, an array of 23 force sensing regions (FSR) combined with 14 infra-red (IR) proximity sensors can be distributed across each footplate (FIG. 5A). Piezoresistive FSRs exhibit a decrease in resistance with increase in force and can be tailored to provide varying sensitivity and range.

To determine the value of an individual site, a baseline measurement of the IR bus voltage can be made with the IR LEDs off. Immediately after this measurement, a single IR LED can be illuminated and another measurement can be made. The difference between the two measurements can represent the total light reflected to a specific sensor site. FSR and IR signals from the left and right footplates can be multiplexed onto separate channels, so a total of 2 ADC inputs and 2 general purpose input-output pins can be needed to capture array values. A set of quantized sensor values for each sensor site can form a sensor "frame" with each frame comprising $N_{FSR}=23$ & $N_{IR}=14$ sites per foot. IR sensors were measured twice in each conversion for correlated double sampling. In each measurement, the readout circuit was configured to only detect alternating (AC) photocurrent generated when light hits the detector. The readout circuit was tuned to only detect light with an AC frequency of at least 150 Hz, and not more than 20,000 Hz. This rejects common light sources in the world. The correlated double sampling process includes making a first measurement with all IR emitters turned off, thereby measuring the level of ambient light with the AC frequencies passed into the detector. Then within less than 10 milliseconds, a single IR emitter was turned on, and the measurement is repeated. The two measurements are subtracted from each other to determine the total amount of light reflected back to the detector from the IR emitter. Because the samples are taken back-to-back, and in a short timeframe, it is assumed that the ambient light in the two measurements is the same, or "correlated" so that subtracting it removes the effect of uncontrollable interference.

For typical microcontrollers, a frame can be produced within 10 ms with a multiplexer update rate of 3.7 kHz. Assuming 8-bit truncation and a frame rate of 10 frames per second, the data rate for the disclosed footplate assembly can be low at only 370 bytes/sec. This data rate can easily be handled by typical low-power wireless radios, e.g. Bluetooth Low Energy.

Sensor fabrication. In one example, a sensor subassembly as disclosed herein was fabricated on a commercial fiberglass PCB to maintain low cost. FSRs were created on the top metal with the geometry in Table 1 (see FIG. 4B). The sensor array disclosed herein can be printed onto a flexPCB substrate using an electroless nickel immersion gold (ENIG) finish to provide reliability and to minimize contact resistance on the FSR traces. The range and sensitivity of each FSR can be tailored to meet the specifications determined above, by altering the pitch and separation of the inter-digitated channels. Each 25 mm×25 mm FSR can be overlaid with 2 mm thick XactFSR piezoresistive film (i.e., from Sensitronics, Bow, Mass.) which permits force measurement with minimal drift and 5-15% accuracy over time. The IR sensors, mulitplexers, and passive components were mounted to the PCB. In some aspects, the total assembled electronics thickness was less than 3 mm. Wire header connectors were used to connect the left and right footplates together to a RedBear Duo (RedBear Lab, Hong Kong, CN) Arduino-compatible board (FIGS. 5A-5B). The Duo strobed bilaterally through all sensor multiplexers, using an onboard ADC for sensor conversion. The sensor strobe rate was programmed to produce a full "frame" of both sides at 10 frames per second. The sensor subassembly disclosed herein can then be capped with an overcoat layer comprising Flex EcoPLA, a flexible robust material with a Shore 45D hardness, or other similar material, to permit humidity and temperature resistance during use. The encapsulation layer can be designed to include bumps over each FSR to act as force accumulators and provide surface texture. Gaps can be left in the overcoat layer over the IR proximity sensors, which can be encapsulated with optically clear epoxy or silicone. The completed sensor array disclosed herein can be a seamless force/position sensor array with an overall thickness of 6-8 mm.

TABLE 1

Interdigitated FSR Trace Dimensions

| | Dimension A | Dimension B |
|---|---|---|
| Fine FSRs | 0.152 mm | 0.152 mm |
| Medium FSRs | 0.203 mm | 0.203 mm |
| Coarse FSRs | 0.254 mm | 0.254 mm |

The disclosed sensor array can be connected to a processor module (i.e., from Blend Micro (RedBearLabs)) with an integrated microcontroller (i.e., from ATmega32U4) within an 18×44×4.3 mm platform. A low power triple axis accelerometer (i.e., ADXL345 from Analog Devices) can be connected to provide footplate orientation sensing so that the FoPPS array can discriminate between offloading due to misplacement and/or tilt activities. The mini-processor board can include Bluetooth Low Energy 4.0 (BLE) or 4.1 communication for secure low power communication using an inbuilt antenna and an operating range of up to 30 m. The BLE radio was used to transmit sensor frames as they were received, i.e., 10 times per second. The radio had an effective line-of-sight range of 20 meters, and the Duo consumed 35 mA continuously while measuring and transmitting sensor data. The communication module can be connected to each sensor subassembly using flexible ribbon cables so that either component can be readily swapped out if necessary.

The disclosed sensor subassembly can be powered by a low-profile 5.8×54×60 mm 2000 mAh rechargeable lithium polymer battery (i.e., from Sparkfun) to provide high energy density in a thin form factor. Initial calculations indicate a total system power draw of 3.7 mA to produce outputs/images at 4 Hz. Assuming 18 hours of daily monitoring (with the system in standby mode while the user sleeps), 30 days of operation can be provided per battery charge. For example, the system described above was powered by a 500 mAh lithium polymer secondary cell, which can allow 2 weeks of continuous monitoring between recharges.

In another exemplary manufacturing process, the electronics of the disclosed footplate assembly were overcoated in a multi-layer process to preserve FSR and IR function while adding environmental and abrasion resistance. A 2-piece protective TPU overcoating (separate top and bottom sections) was 3D-printed on a low-cost fused filament fabrication (FFF) printer. Small 1" squares of 2 mm XactFSR film (Sensitronics, Bow, Wash.) were glued to the underside of the top layer of the TPU overcoating such that they rested directly above each FSR on the FoPPS. A 2 mm tall bump in the top of the TPU overcoating was positioned above each FSR on the FoPPS to act as a stress concentrator, ensuring that pressure from a patient's foot would be distributed onto an FSR, and not another part of the FoPPS PCB. A silicone caulk glued the two TPU parts together, fitting snuggly over the PCB and completely encapsulating it (FIGS. 5A-5B).

Example 2: Footplate Pressure and Positioning Sensor Characterization and Demonstrations Fabricated prototypes were first characterized in static conditions, and then tested with a prosthetic lower limb extremity outfitted with an athletic shoe to represent realistic force distributions. Testing with the prosthetic limb generated real-time readouts of sensor data via a smartphone app; this data is presented qualitatively.

Figure 6:
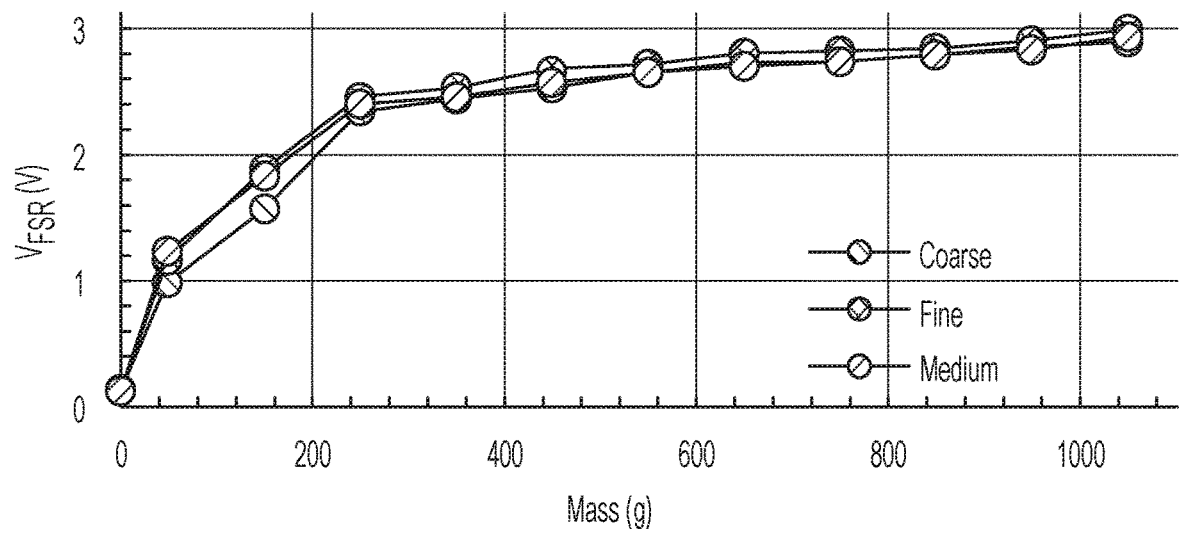
FIG. 6 shows three variations in FSRs used by an exemplary footplate assembly that showed monotonic response curves to weight, sufficient to determine foot pressure distribution across the PWC footplate.

Force sensor response curve. Each of the three FSR layouts (coarse, fine, and medium) was tested using precision masses (0.00-1.05 kg) which were applied successively to a single sensor site. This range was selected based on pressure ranges attained from the CONFORMat data with human volunteers. Static resistance measurements were made with an Agilent 34410A digital multimeter. The sensors tested showed a monotonic, nonlinear response to applied force (FIG. 6). As expected, the fine sensor was the most sensitive to applied force. None of the sensors saturated, although the sensors had reduced sensitivity above 200 g loading. This suggests that sensor overload is unlikely to occur with typical foot pressure distributions and this FSR topology, even with the finest FSR spacing.

Figure 7:
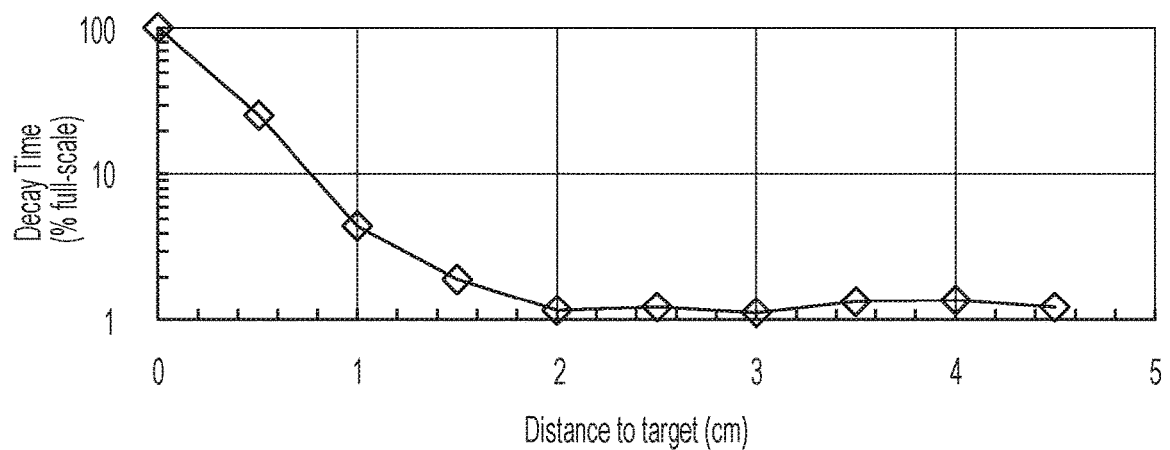
FIG. 7 shows the measured response of IR sensors of an exemplary footplate assembly as disclosed herein. The sensitivity drops after 2 cm which improves detection of excessive foot-footplate spacing.

Infrared sensor response curve. The IR sensor distance response was tested using a black rubber target to simulate the underside of a shoe. IR sensors were pulsed as described previously to reduce ambient light source interference. The Duo microcontroller was programmed to produce the switching and correlated charge decay measurements described in FIG. 3B. Component values were selected to attain a nominal $\tau_D$ of 500 µs, and the Duo could calculate delay time within approximately 1% based on code executing speed limits. The IR LED was controlled by the Duo using a current limiting resistor to set the peak current to 20 mA. IR distance data were transmitted to a computer serial port for data collection. Lighting conditions in this test were approximately constant, although the IR sensor did not display sensitivity to ambient lighting conditions, as designed. A typical IR sensor response curve showed a monotonic response to target distance, with greatly reduced sensitivity beyond 2 cm (FIG. 7). This range was sufficient for foot detection and could be tuned at the expense of IR LED power consumption.

Wireless readout electronics and smartphone app. A data processing app can developed to interface with any smartphone or other remote computing device. To minimize power drainage, the app can use sleep/sniff operation. Specifically, the app can sleep, power up every 2 seconds to listen to the wireless transmitter of the device and then go back to sleep unless a mispositioning event occurs. In such a case, an alert can sound using visual, audio and/or vibration notification to notify the user that their foot is improperly positioned (FIG. 2). The moderate alert can sound when the foot is misplaced and a more urgent alarm will sound if the foot is entirely off the footplate. The user can have the option to select the mode or modes of alert and alarm notifications including visual, audio and/or vibration. A moderate audiovisual alert informs the user that their foot is mispositioned, while a more urgent alarm triggers if the foot is entirely off the footplate. In addition to providing real-time foot positioning feedback to the PWC user, data records may be downloaded by clinicians to better understand positioning risks. The average current usage using BLE 4.0 sleep/sniff communication is 1 µA, with a peak use during active notification of up to 15 mA. Local storage of position and force data can be provided together with the capability to send regular updates to the clinical team on changes in foot mispositioning occurrence frequency to permit monitoring of evolving issues. This low data rate BLE scheme can have a relatively minor impact on battery life, drawing far less power than wireless music streaming and navigation tasks, which are routinely handled by modern mobile platforms.

More specifically, sensor data were received by a custom iOS app running on an iPhone 6 or an iPod Touch. This app was developed to simulate real-time detection of foot position to provide feedback and warnings to users. The app has three user interfaces (FIGS. 8A-8C) designed to be simple to interpret for PWC users who might be distracted by activities of daily living. The app receives sensor frames and processes them to determine if the user should be alerted of a dangerous or improper foot position. The app was programmed with a simple algorithm which averaged the footplate pressure and alerted the user if the weighted sensor values were below a threshold. FIGS. 8A-8C respectively show the three user interfaces. This system was used for pilot trials (Table 2).

TABLE 2

Performance Summary

| | |
|---|---|
| Sensor Size | 145 × 206 cm per foot |
| FSR sensors | 46 (23 per foot) |
| IR sensors | 28 (14 per foot) |
| Force sensing range | 0-1150 g minimum |
| IR Distance sensing range | 2.0 cm |
| Wireless sensor frame | 10 frames per second |
| Wireless protocol | Bluetooth Low Energy |
| Power draw | 35 mA from 3.6-V battery |

User interface design options may include alarm options and user override, such as an option to manually or verbally deactivate monitoring, such as when transferring or sitting crosslegged. Suitable SCI/D Service inpatients can be used in evaluation of the disclosed system, including ten users who can have it installed on their PWCs and have their foot position during normal ADL monitored for a week.

The duration of monitoring can allow determination of function and user satisfaction. Non-parametric statistical tests can be employed to determine changes in footplate force, and since different foot regions exert different magnitudes and force ranges on the footplate, the adaptability of the Flex EcoPLA force accumulator shape and FSR design can specify force sensors of varying sensitivity within the same sensor array. For example, if the hardware of the sensor subassembly provides more information than is needed to capture foot position and forces during ADL, a more limited set of sensors may be used for foot position determination, with un-read sensors functioning as backups which may be selected if primary sensors fail. This pruning approach can streamline sensor readout/processing overhead and will provide opportunities for cost reduction and further refinement. Further, clinical end users and PWC users may have different viewpoints on user-centered factors such as alarm options and user override. For example, they may prefer to have a single method for alerts and alarms. To meet this challenge, an option to personalize the user interfaces at installation can be provided to limit functions for specific user preferences.

Example 3: Development of FoPPs System

The disclosed system can include a first type of software (e.g., a first software module) that provides real-time feedback when the foot is misplaced from the footplate posing imminent danger to the PWC user's lower limbs. The system can be further developed by extending the system algorithms to incorporate additional sensor input and predictive algorithms for PWC users, caregivers and clinical providers. A second type of software (e.g., a second software module) can provide PWC users and caregivers with feedback which permits them to differentiate potentially hazardous situations that do not pose an immediate danger but which should be addressed. These notifications can be validated in the field and can be less obtrusive than the first type of software or users will be subject to alarm fatigue. A third type of software (e.g., a third software module) can allow clinicians to make sense of the data and understand the dynamics of what takes place at the footplate during everyday use. A "Report" function can allow PWC users to report safety concerns that the sensors/algorithms did not identify. The third type of software can provide information with regard to which scenarios are potential safety issues as opposed to relatively benign events.

To this end, sensor components can be added as well as training algorithms in the field, and obtaining feedback from PWC users with SCI/D and clinicians providing PWC technology. This feedback can be used fine tune alarm frequency and type of data monitoring to ensure end user adoption and address the unmet need for LL position awareness.

Development and field testing of the Second Type of Software ("Differentiation" software): Accelerometer, gyroscopic, and GPS sensors can be incorporated into the sensor subassembly of the disclosed system such that each footplate sensor can transmit 2D force distribution, 2D infrared distance to foot, and footplate inclination relative to gravity to the smartphone app. The smartphone can use its onboard sensors (accelerometer, gyroscope, and GPS) to describe the chair's motion in space: inclination, rotational velocity, and ground-truth velocity (derived from GPS data). The footplate and smartphone accelerometers can be used to determine if the user is tilting or reclining the chair as opposed to moving up or down a ramp. All data channels collected will be used in post hoc analysis for algorithm determination using the second type of software to warn users of impending foot motion based on chair dynamics.

System evaluation and data acquisition. A study group of 15 suitable PWC users can be selected from the SCI/D Seating Clinic to have a system as disclosed herein installed on their PWC by a SCI-specialized Assistive Technology Professional (ATP). "Safe" footplate positions can be determined by the ATP and sensor data template stored in the smartphone app disclosed herein. Each study participant can then assess the system for two weeks in community use. During this time, the app can continuously monitor sensor values and provide alarms based on preliminary pattern-matching algorithms. Additionally, users can rate alarms to determine utility and appropriateness of the algorithms employed by the software.

Development and field testing of "Differentiation" software technology: In addition to including the encapsulated force and proximity sensor arrays which record vertical and horizontal displacement and forces on the footplate, the disclosed system can further include an additional accelerometer and utilize existing smartphone sensors to provide real time notification of changes in PWC operation (velocity, turning), and seating position. These features can be added to the surface contact, position and/or pressure data to reveal foot position patterns which could pose an increased risk of foot pressure injury if not corrected. This can be tested in a diverse cohort of 15 PWC users who can assess the system in community use for two weeks. Position and sensor data can be monitored continuously using the disclosed system.

Incorporation of accelerometer, gyroscopic, and GPS sensors. The disclosed sensor subassembly can be modified to include a small, precision, low power, 3-axis accelerometer, e.g. ADXL345 (Analog Devices Inc., Norwood, Mass.) on each footplate device. During use, each footplate sensor can transmit three channels of data to a chair-mounted smartphone: 2D force distribution, 2D infrared distance to foot, and footplate inclination relative to gravity. The smartphone, besides functioning as a user interface and data processor, can use onboard sensors to provide three additional data classes describing the chair's motion in space: chair inclination (smartphone accelerometer), chair rotational velocity (gyroscope), and chair ground-truth velocity (from GPS data). The angle difference between the footplate and chair can be computed as an angular difference in both accelerometers to determine if the user is tilting the chair or moving the leg rests as opposed to moving up or down a ramp. All data channels can be collected during user testing for post hoc analysis of foot position changes correlated with certain events, e.g., foot shifts during tilt, recline or high speed turning. Ultimately, these sensor data can be used to add predictive features to the "differentiation" software, which can warn users of impending foot motion based on chair dynamics.

System evaluation and data acquisition. Veterans with SCI/D who use PWC for their primary mobility source will be selected to evaluate the disclosed system. Users will have the disclosed systems installed on their PWCs and sensor output during normal ADL in the community will be monitored for two weeks. For each study participant, a customized foot template will be computed, similar to the training phase of fingerprint and facial recognition systems. PWC users can work with an ATP in the LSCVAMC SCI/D Wheelchair Clinic, who can install the disclosed device onto the footplates and readjust the chair for optimal foot position. The user's feet can be moved to a standardized series of "safe" locations on the footplate and for each position, photographic images and sensor data (FSR and IR values for each array location) can be recorded for both feet. This will generate a template set of sensor values corresponding to safe foot positions, which will be locked into the disclosed app as well as capture images confirming precise foot position. During the community testing period, the disclosed app can continuously monitor the disclosed sensor values using template matching through sum of absolute differences. The covariance matrix between FSR and IR values can be used to compute the maximum Mahalanobis distance for the safe template. During PWC operation, if the absolute differences exceed a threshold, or if the FSR/IR covariance exceeds the maximum safe Mahalanobis distance, the user can be alerted. For each alert, the user will be asked to rate the alert (FIG. 9), indicating whether their foot was misplaced at that moment. An additional app feature can be a "Report" function which allows the PWC user to report potential safety concerns that the sensors/algorithms did not identify. The disclosed app can record the user's input to determine true positives, false positives and false negatives for this initial algorithm, which will then inform the algorithm for the third type of software, which is designed for clinicians.

During the testing period, the sensor channels can be recorded to the smartphone internal memory. Each footplate can generate sensor "frames" consisting of 8-bit values for FSR and IR sensors, at a rate of at least 10 frames/second. Faster frame rates may be needed due to data variance in real-world conditions. Other sensor channels to be recorded include smartphone and footplate accelerometer angle (relative to Earth gravity), angular velocity, and GPS-derived velocity. The disclosed system will not record GPS coordinates for the purpose of maintaining participant privacy. The sensors can be filtered using digital anti-aliasing filters and decimated or interpolated as needed to match the footplate frame rate. Thus, each footplate sensor frame can have a matching set of other sensor data so PWC angle, incline, and velocity can be correlated frame-by-frame. In addition, the smartphone software will be annotated when and if the user was alarmed, and whether the user agreed that the alarm was appropriate.

Development of Software technology for Clinicians. Evaluation of aggregate data and development of predictive algorithms: The false and true positive rates for the initial algorithm can be determined from user testing. Human centered design (HCD) principles can be used to work with ATPs and PWC users to ensure that system balances the risk of user alarm fatigue with that of a missed positive. Predictive algorithms can be developed using velocity and chair-angle measures to determine position-related risks while minimizing false positives and maximizing warning time before true positives.

Algorithm re-evaluation and PWC user satisfaction assessment After initial testing and algorithm training is completed, the 15 PWC users and the ATPs who participated in the study described above can be re-convened to evaluate the updated system for another two-week period to provide iterative feedback on the reliability and usability of the updated system alarms. PWC users and ATPs can complete a validated and well-established technology satisfaction questionnaire based on the QUEST 2.0 instrument. Items in the satisfaction domain of QUEST 2.0 most relevant for FoPPS user field testing will be adjustments, safety, durability, simplicity of use, comfort and effectiveness.

Figure 10:
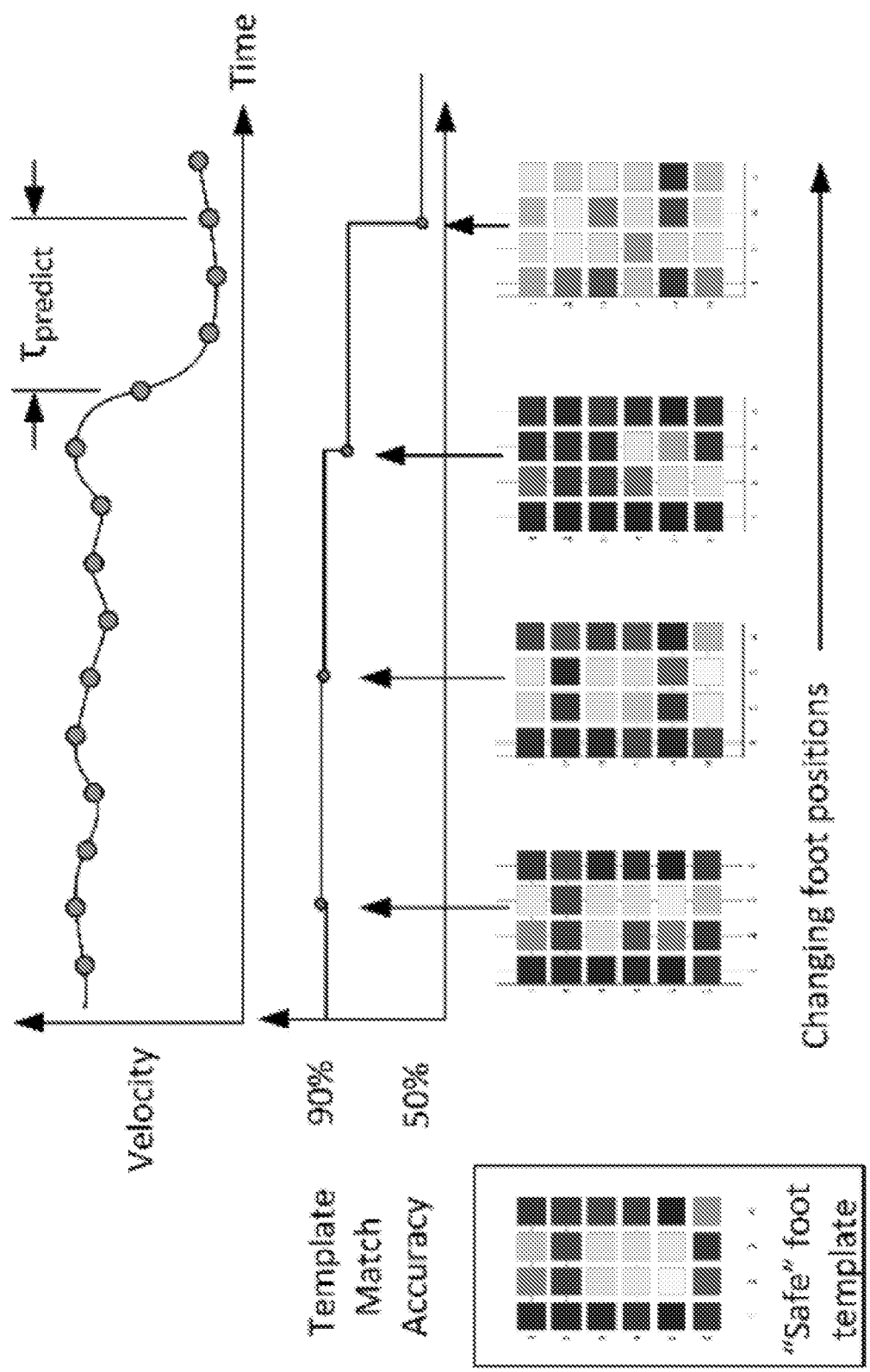
FIG. 10 shows an example simulation of an algorithm for characterizing the quality of footplate contact as disclosed herein. Footplate sensor values can be used to calculate match accuracy relative to a safe foot template, but other sensor modalities such as chair velocity can potentially predict foot position changes by time $\tau_{predict}$.

Evaluation of aggregate data and development of predictive algorithms: False positive, true positive and false negative rates for the initial algorithm can be determined from user testing. Post hoc refinements can be applied to the notification algorithm by modifying parameters such as safe template array weighting, maximum Mahalanobis distance and absolute summed differences thresholds, or through probability distribution analysis of paired sensor/template frames. Refinements can use a guided approach, such as gradient descent, by computing the true positive, false positive and false negative rates for each adjusted parameter. Next, the predictive properties of velocity and chair-angle measures can be analyzed. Correlations between foot malposition, chair velocity or inclination changes, and user app feedback can be calculated over a sliding time window to determine time lags between events and foot shifts (see data analysis below). These time-lags ($\tau_{predict}$) can facilitate prediction of foot position shifts based on chair motion (FIG. 10). The clinical-use algorithm can incorporate relevant sensor data into the calculation of template-frame mismatch, such that dynamic alert thresholds can be calculated. For example, if a sudden change in velocity is detected, the alert threshold can be temporarily reduced by the danger probability. The algorithm can be adjusted to minimize false positives and false negatives, concurrently maximizing warning time before true positives.

The provision of a report with footplate interface pressure maps and information on issues such as the impact of velocity or turning on foot mispositioning to the user's provider team has the potential to initiate and guide early seating interventions to minimize further catastrophic foot misplacement events.

Data Analysis: Subjects will be included to perform initial algorithm development and determine user satisfaction for the "differentiation" and "clinical" software components of the disclosed system. Based on prior studies, normal distribution of variables cannot be assumed. Non-parametric statistical tests will therefore be employed to determine changes in sensor distribution outcome variables over time. Each subject can serve as his/her own control, because each subject will have a customized "safe" foot position template generated through supervised training with an ATP. The template can be generated from a variety of foot positions; rolling variance of frame values for each foot position can be calculated to determine if enough foot positions have been tested. Template generation can continue until a 95% certainty in template accuracy is statistically achieved. The Mahalanobis distance for each foot position from the average "safe" template can be calculated as a threshold for user notification during the two-week trial period.

Data from a typical user can generate 11 channels of data (both feet being monitored with 23 FSR & 16 sensor frames and 1 incline sensor/foot, smartphone linear and angular velocity and incline). It is estimated that recordings can produce 90 MB of data per day (for 10 frames with time-stamped sensor and user input values per frame), for a total of 1.26 GB of data per user per 2-week trial. Data can be uploaded daily, or more frequently, using the smartphone internet connectivity. All modern smartphones provide this level of internal storage and at minimum WiFi upload. MATLAB scripting can be used to automatically process the data by using event detection measures to detect situations where the user was alerted to improper foot position or provided app feedback. For each true positive or false negative in the data set (meaning the foot was identified as being in the wrong position), the prior 10 seconds worth of accelerometer, gyroscope, and GPS velocity data can be selected, as well as the frame data from the disclosed sensor subassembly of the footplate assembly. An Extended Kalman Filter (EKF) can be applied to these data to reduce the effect of noise and provide a more accurate estimate of the true foot position and chair dynamics. EKF processing of sensor frames can also permit interpolation of frames faster than 100 ms. The cross correlation between frame-template mean differences and data channels can be computed, as well as the cross-correlation between first-order differences. For all events, time lags ($\tau_{predict}$ values) can be computed. ANOVA models can be used with wheelchair users as a blocking factor to detect which factors are statistically unique in predicting foot position changes. Confidence intervals on the effects can be computed to determine the average $\tau_{predict}$ value for each type of sensor data. A hazards ratio can also be calculated for each factor to prioritize user alerting, e.g., if multiple chair motions are detected. The "clinical" algorithm can be updated to include a context-aware foot detection threshold, which can dynamically adjust the detection threshold with a memory of $\tau_{predict}$ for each type of sensor data. The "clinical" software (based on the updated algorithm) can then be adjusted and re-tested on collected data to maximize detection and to minimize false positives.

As further disclosed herein, in some cases, it is possible that the prototype sensors disclosed herein provide more information than is needed to capture foot, footplate and wheelchair positions during ADL. In this case, a limited set of sensors may be used for foot position determination, with un-read sensors functioning as backups which can be selected if primary sensors fail. This pruning approach can streamline sensor readout/processing overhead and will provide opportunities for cost reduction and further fine-tuning. Alternatively, clusters of sensors showing high correlation can be used in a "majority vote" scheme to further reduce the data bandwidth and to safeguard against single-sensor failures. If issues in data storage/transmission are encountered, the data streams can be decimated at the smartphone or use methods such as run-length encoding to compress recorded data. If the initial approach to algorithm development is ineffective in predicting foot position and hazard events, other approaches to principle component analysis for algorithm predictions can be used. If the "clinical" algorithm does not predict foot movement faster than a user's reaction time before foot movement, chairs could be automatically slowed down or stopped to prevent instant foot damage. Clinical end users and PWC users have different viewpoints on user-centered factors such as alarm sensitivity, alarm options and user override, for example, one group may prefer to have a less sensitive alarm setting to minimize alarm fatigue, or single type of alert. If this is the case, an option can be developed to personalize the user interfaces at installation to limit functions for specific user preferences. It may be that the feet rarely maintain good contact with the footplate during use. Redesign of a PWC footplate incorporating the disclosed system may be needed. Users may develop an unrealistic sense of safety when using the disclosed systems and take greater risks in PWC operation thinking that they be able to make a correction if their foot is misplaced on the footplate. However, the disclosed system accelerometers can warn users of excessive speeds and ramp inclines or declines which are not ADA-compliant, thus increasing safety.

Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A footplate assembly comprising: a base plate defining an upper surface and a bottom surface; a sensor subassembly secured to the upper surface of the base plate and defining a contact surface for engagement with a foot, the sensor subassembly comprising: a plurality of force sensors configured to produce respective outputs indicative of force applied by the foot; and a plurality of proximity sensors configured to produce respective outputs indicative of a distance between the foot and the contact surface.

Aspect 2: The footplate assembly of aspect 1, further comprising processing circuitry communicatively coupled to the plurality of force sensors and the plurality of proximity sensors to receive the outputs from the plurality of force sensors and the plurality of proximity sensors.

Aspect 3: The footplate assembly of aspect 2, wherein the sensor subassembly further comprises a coating structure that at least partially defines the contact surface.

Aspect 4: The footplate assembly of aspect 3, wherein the coating structure comprises: a plurality of overlay portions, each overlay portion resting directly above a respective force sensor of the plurality of force sensors; and a plurality of overcoat portions, each overcoat portion being secured to a respective overlay portion and directly overlying a respective force sensor.

Aspect 5: The footplate assembly of aspect 4, wherein at least one overcoat portion of the plurality of overcoat portions has a center point and a perimeter, wherein a height of the overcoat portion at the center point is greater than a height of the overcoat portion at the perimeter.

Aspect 6: The footplate assembly of aspect 4, wherein each overcoat portion of the plurality of overcoat portions has a center point and a perimeter, wherein a height of each overcoat portion at the center point is greater than a height of the overcoat portion at the perimeter.

Aspect 7: The footplate assembly of any one of aspects 4-6, wherein the plurality of overcoat portions comprise a thermoplastic urethane (TPU) coating material.

Aspect 8: The footplate assembly of any one of the preceding aspects, wherein the plurality of force sensors comprise a plurality of force-sensing resistors.

Aspect 9: The footplate assembly of any one of the preceding aspects, wherein the plurality of proximity sensors comprise a plurality of infrared distance sensors.

Aspect 10: The footplate assembly of any one of the preceding aspects, wherein the plurality of force sensors and the plurality of proximity sensors are arranged in a plurality of rows and a plurality of columns relative to the upper surface of the base plate, the base plate having a length extending between toe and heel portions of the base plate, wherein the plurality of columns extend along the length of the base plate and the plurality of rows extend perpendicularly or substantially perpendicularly to the plurality of columns, wherein the plurality of columns comprises a first plurality of columns comprising only force sensors and a second plurality of columns comprising only proximity sensors.

Aspect 11: The footplate assembly of aspect 10, wherein the first and second pluralities of columns are provided in an alternating arrangement.

Aspect 12: The footplate assembly of aspect 11, wherein at least a portion of the plurality of rows comprise at least one force sensor and at least one proximity sensor.

Aspect 13: The footplate assembly of aspect 12, wherein the plurality of rows comprises at least four rows, and wherein the plurality of columns comprises at least five columns.

Aspect 14: The footplate assembly of any one of the preceding aspects, wherein the plurality of proximity sensors are distributed among a plurality of clusters, wherein the plurality of clusters comprises a first cluster proximate the toe portion of the base plate, a second cluster proximate the heel portion of the base plate, and a third cluster spaced from and positioned between the first and second clusters.

Aspect 15: The footplate assembly of any one of the preceding aspects, wherein the plurality of force sensors comprises a plurality of square force-sensing resistors.

Aspect 16: The footplate assembly of aspect 15, wherein the plurality of square force-sensing resistors comprise at least one fine force-sensing resistor having a first size, at least one medium force-sensing resistor having a second size larger than the first size, and at least one coarse force-sensing resistor having a third size larger than the second size.

Aspect 17: The footplate assembly of any one of aspects 2-16, wherein the processing circuitry comprises a microcontroller.

Aspect 18: The footplate assembly of aspect 17, further comprising a remote transmitter that is communicatively coupled to the microcontroller.

Aspect 19: The footplate assembly of any one of aspects 2-18, further comprising a rechargeable power source configured to provide power to the footplate assembly.

Aspect 20: A system comprising: a wheelchair having at least one footplate assembly of any one of the preceding aspects, wherein the wheelchair is provided as either (a) an overlay to a footplate structure of the wheelchair or (b) an integrated portion of a footplate structure of the wheelchair.

Aspect 21: The system of aspect 20, wherein the at least one footplate assembly has processing circuitry that is communicatively coupled to the plurality of force sensors and the plurality of proximity sensors to receive the outputs from the plurality of force sensors and the plurality of proximity sensors, wherein the processing circuitry is configured to produce an output indicative of a quality of contact between a foot and the contact surface of at least one footplate assembly.

Aspect 22: The system of aspect 21, further comprising a remote computing device having a processing unit that is in wireless communication with the processing circuitry of the at least one footplate assembly.

Aspect 23: The system of aspect 22, wherein the remote computing device is a smartphone or a tablet.

Aspect 24: A method comprising: using a wheelchair having at least one footplate as recited in any one of aspects 1-19.

Aspect 25: The method of aspect 24, wherein the at least one footplate assembly has processing circuitry that is communicatively coupled to the plurality of force sensors and the plurality of proximity sensors, and wherein the method further comprises using the processing circuitry to receive the outputs from the plurality of force sensors and the plurality of proximity sensors.

Aspect 26: The method of aspect 25, wherein the processing circuitry produces an user-observable output indicative of a quality of contact between a foot and the contact surface of at least one of the two footplate assemblies.

Aspect 27: The method of aspect 26, wherein the user-observable output comprises a visual alert, an audible alarm, a vibration, or combinations thereof.

Aspect 28: The method of aspect 25, further comprising: using the processing circuitry to wirelessly transmit to a remote computing device information indicative of the outputs from the plurality of force sensors and the plurality of proximity sensors.

Aspect 29: The method of aspect 28, further comprising: using a processing unit of the remote computing device to produce a visual or audible output indicative of a quality of contact between a foot and the contact surface of at least one footplate assembly.

Aspect 30: The method of aspect 29, wherein the remote computing device is a smartphone or a tablet.

What is claimed is:

1. A footplate assembly configured to be coupled to a wheelchair and comprising:
    a base plate defining an upper surface and a bottom surface;
    a sensor subassembly secured to the upper surface of the base plate and defining an upwardly-facing contact surface for engagement with a foot, the sensor subassembly comprising:
        a plurality of force sensors configured to produce respective outputs indicative of force applied by the foot; and
        a plurality of proximity sensors configured to produce respective outputs indicative of a distance between the foot and the contact surface.

2. The footplate assembly of claim 1, further comprising processing circuitry communicatively coupled to the plurality of force sensors and the plurality of proximity sensors to receive the outputs from the plurality of force sensors and the plurality of proximity sensors.

3. The footplate assembly of claim 2, wherein the sensor subassembly further comprises a coating structure that at least partially defines the contact surface.

4. The footplate assembly of claim 3, wherein the coating structure comprises:

a plurality of overlay portions, each overlay portion resting directly above a respective force sensor of the plurality of force sensors; and a plurality of overcoat portions, each overcoat portion being secured to a respective overlay portion and directly overlying a respective force sensor.

5. The footplate assembly of claim 4, wherein at least one overcoat portion of the plurality of overcoat portions has a center point and a perimeter, wherein a height of the overcoat portion at the center point is greater than a height of the overcoat portion at the perimeter.

6. The footplate assembly of claim 4, wherein each overcoat portion of the plurality of overcoat portions has a center point and a perimeter, wherein a height of each overcoat portion at the center point is greater than a height of the overcoat portion at the perimeter.

7. The footplate assembly of claim 4, wherein the plurality of overcoat portions comprise a thermoplastic urethane (TPU) coating material.

8. The footplate assembly of claim 1, wherein the plurality of force sensors comprise a plurality of force-sensing resistors.

9. The footplate assembly of claim 1, wherein the plurality of proximity sensors comprise a plurality of infrared distance sensors.

10. The footplate assembly of claim 1, wherein the plurality of force sensors and the plurality of proximity sensors are arranged in a plurality of rows and a plurality of columns relative to the upper surface of the base plate, the base plate having a length extending between toe and heel portions of the base plate, wherein the plurality of columns extend along the length of the base plate and the plurality of rows extend perpendicularly or substantially perpendicularly to the plurality of columns, wherein the plurality of columns comprises a first plurality of columns comprising only force sensors and a second plurality of columns comprising only proximity sensors.

11. The footplate assembly of claim 10, wherein the first and second pluralities of columns are provided in an alternating arrangement.

12. The footplate assembly of claim 11, wherein at least a portion of the plurality of rows comprise at least one force sensor and at least one proximity sensor.

13. The footplate assembly of claim 12, wherein the plurality of rows comprises at least four rows, and wherein the plurality of columns comprises at least five columns.

14. The footplate assembly of claim 12, wherein the plurality of proximity sensors are distributed among a plurality of clusters, wherein the plurality of clusters comprises a first cluster proximate the toe portion of the base plate, a second cluster proximate the heel portion of the base plate, and a third cluster spaced from and positioned between the first and second clusters.

15. The footplate assembly of claim 1, wherein the plurality of force sensors comprises a plurality of square force-sensing resistors.

16. The footplate assembly of claim 15, wherein the plurality of square force-sensing resistors comprise at least one fine force-sensing resistor having a first size, at least one medium force-sensing resistor having a second size larger than the first size, and at least one coarse force-sensing resistor having a third size larger than the second size.

17. The footplate assembly of claim 2, wherein the processing circuitry comprises a microcontroller.

18. The footplate assembly of claim 17, further comprising a remote transmitter that is communicatively coupled to the microcontroller.

19. The footplate assembly of claim 2, further comprising a rechargeable power source configured to provide power to the footplate assembly.

20. A system comprising:
a wheelchair having at least one footplate assembly, each footplate assembly comprising:
a base plate defining an upper surface and a bottom surface;
a sensor subassembly secured to the upper surface of the base plate and defining an upwardly-facing contact surface for engagement with a foot, the sensor subassembly comprising:
a plurality of force sensors configured to produce respective outputs indicative of three applied by the foot; and
a plurality of proximity sensors configured to produce respective outputs indicative of a distance between the foot and the contact surface.

21. The system of claim 20, wherein the at least one footplate assembly has processing circuitry that is communicatively coupled to the plurality of force sensors and the plurality of proximity sensors to receive the outputs from the plurality of force sensors and the plurality of proximity sensors, wherein the processing circuitry is configured to produce an output indicative of a quality of contact between a foot and the contact surface of at least one of the footplate assemblies.

22. The system of claim 21, further comprising a remote computing device having a processing unit that is in wireless communication with the processing circuitry of the at least one footplate assembly.

23. The system of claim 22, wherein the remote computing device is a smartphone or a tablet.

24. A method comprising:
using a wheelchair having at least one footplate assembly, each footplate assembly comprising:
a base plate defining an upper surface and a bottom surface;
a sensor subassembly secured to the upper surface of the base plate and defining an upwardly-facing contact surface for engagement with a foot, the sensor subassembly comprising:
a plurality of force sensors configured to produce respective outputs indicative of force applied by the foot; and
a plurality of proximity sensors configured to produce respective outputs indicative of a distance between the foot and the contact surface;
wherein the at least one footplate assembly has processing circuitry that is communicatively coupled to the plurality of force sensors and the plurality of proximity sensors, and wherein the method further comprises using the processing circuitry to receive the outputs from the plurality of force sensors and the plurality of proximity sensors; and
using the processing circuitry to wirelessly transmit to a remote computing device information indicative of the outputs from the plurality of force sensors and the plurality of proximity sensors.

25. The method of claim 24, wherein the processing circuitry produces an user-observable output indicative of a quality of contact between a foot and the contact surface of at least one footplate assembly.

26. The method of claim 25, wherein the user-observable output comprises a visual alert, an audible alarm, a vibration, or combinations thereof.

27. The method of claim 24, further comprising:
using a processing unit of the remote computing device to produce a visual or audible output indicative of a quality of contact between a foot and the contact surface of at least one footplate assembly.

28. The method of claim 27, wherein the remote computing device is a smartphone or a tablet.

29. The footplate assembly of claim 1, wherein the plurality of proximity sensors comprise at least two types of proximity sensors, the at least two types of proximity sensors being selected from a group of proximity sensor types consisting of: force-sensing resistors; force-sensing capacitors; force-sensing inductors; force-sensitive oscillators; or strain-sensitive, amorphous, crystalline or magnetic materials.

* * * * *